United States Patent [19]
Fujita et al.

[11] Patent Number: 5,974,219
[45] Date of Patent: Oct. 26, 1999

[54] CONTROL METHOD FOR DETECTING CHANGE POINTS IN MOTION PICTURE IMAGES AND FOR STOPPING REPRODUCTION THEREOF AND CONTROL SYSTEM FOR MONITORING PICTURE IMAGES UTILIZING THE SAME

[75] Inventors: Takehiro Fujita, Kokubunji; Takafumi Miyatake, Hachioji; Akio Nagasaka, Kokubunji; Katsumi Taniguchi, Hachioji, all of Japan

[73] Assignee: Hitachi, Ltd., Tokyo, Japan

[21] Appl. No.: 08/727,046

[22] Filed: Oct. 8, 1996

[30] Foreign Application Priority Data

Oct. 11, 1995 [JP] Japan ................................ 7-262643

[51] Int. Cl.$^6$ ................................ H04N 5/93; H04N 9/74
[52] U.S. Cl. ................................ 386/52; 386/4
[58] Field of Search ................................ 386/52, 53, 55, 386/46, 4, 1, 126, 125, 124; 360/13; H04N 5/93, 9/74

[56] References Cited

U.S. PATENT DOCUMENTS 5,083,860  1/1992  Miyatake et al. .
5,621,536  4/1997  Kizu ................................ 386/52

*Primary Examiner*—Robert Chevalier
*Attorney, Agent, or Firm*—Antonelli, Terry, Stout & Kraus, LLP

[57] ABSTRACT

Only a video cut (containing a frame) designated by a user is automatically and correctly extracted directly from a video image under playing operation at high speed. A judgement is made as to whether or not the frame of the video image is designated by the user. When such a user designation is made, a detection is made of a change point in the video cut containing this designated frame (reverse playing direction, forward playing direction). Under such a condition that a frame image immediately before this change point is displayed, the playing operation of the video image is brought into a pause state. Accordingly, only the video cut desired by the user can be extracted during a single playing operation of the video image, and the video image can be edited in a high efficiency.

19 Claims, 11 Drawing Sheets

CONTROL METHOD FOR DETECTING CHANGE POINTS IN MOTION PICTURE IMAGES AND FOR STOPPING REPRODUCTION THEREOF AND CONTROL SYSTEM FOR MONITORING PICTURE IMAGES UTILIZING THE SAME

CROSS-REFERENCE TO RELATED APPLICATION

The present application relates to subject matter described in application Ser. No. 08/604,606 filed on February 21, entitled "METHOD AND APPARATUS FOR DETECTING A POINT OF CHANGE IN A MOVING IMAGE" invented by Akio NAGASAKA, Takafumi MIYATAKE, Kazuaki TANAKA, Takehiro FUJITA, and Shigeki NAGAYA, claiming priority based on JAPANESE PATENT APPLICATION NO. 7-032027 filed Feb. 21, 1995, the disclosure of which is hereby incorporated by reference.

BACKGROUND OF THE INVENTION

The present invention relates to a technique for detecting a change point of a video cut of a video image (continuous video image section photographed by a single video camera) stored in a video tape, a disk and the like, and also to a technique for playing/editing the video image by using this detecting technique. In particular, the present invention concerns a change-point-detection control method of a video image suitable for carrying out the editing work of the video image in a high efficiency, to a play-stop control method performed based on this change-point-detection control method, and to a video image editing system with employment of these control methods.

Very recently, video image (moving image) information could be utilized in digital forms since high-speed computers are available and storage devices with large memory capacities are available. Especially, in the editing field of video images, digitalized video images could be handled in photographing apparatuses and editing apparatuses, by which television broadcast programs are manufactured, video programs are formed, and hyper media moving pictures are manufactured. For instance, "Media Composer", "Video Shop" and the like are marketed by Avid Technology firm in U.S.A. as such video image editing apparatuses.

To effectively proceed with editing works of video images, image playing operations are preferably performed in a cut wise when contents of the video images are confirmed. This is because only a content of each video cut can be investigated without being affected by the contents of other video cuts. Also, it is a video cut and store this extracted video cut in order to utilize a storage device in a high efficiency.

However, the above-described products may provide only the editing work steps, but cannot automatically extract only each of video cuts to play only the extracted video cuts even when a plurality of video cuts are contained in picture elements. Therefore, in order to fine out a video cut desired by a user from a large number of video cuts contained in picture elements by using such an editing apparatus, contents of video images must be confirmed by repeatly carrying out the fast forward operation and the rewind operation by the user himself. Also, to extract a desirable video cut from the picture elements, the operator must find out the first frame (IN frame) and the last frame (OUT frame) of the video cut by utilizing the jog-shuttle dial, the scroll bar of the computer screen, and the like, while confirming the images and the sounds in unit one frame in the manual manner. This work should give heavy work loads to beginners and unexperienced editors, and would lower the editing work efficiency.

As to the techniques capable of easily confirming the contents of picture elements based on the video cuts, there are, for example, Japanese Laid-open Patent Application No. 4-111181 (i.e., CHANGE POINT DETECTING METHOD OF MOVING PICTURES" Japanese Patent Application No. 2-230930, U.S Pat. No. 5,083,860), and Japanese Patent Application No. 7-32027 ("METHOD FOR DETECTING CHANGE POINTS IN MOVING PICTURES AND APPARATUS") invented by Inventors of the present invention. These techniques can automatically segment the video image every video cut based upon the feature amounts of the images and the sounds of the video image, and can form the list of the still images as the typical images for the respective video cuts. Since this list of the typical images indicates the contents of the video image such as a table and an index of a book, the operators need not confirm the video image of the elements by frequently performing the fast forward operation and the rewind operation. Since the video image can be played in a segment unit called as a video cut, these techniques are useful to grasp the structure of the video image, and may achieve that a rough structure is conceivable during the editing work.

However, there are many possibilities that similar scenes are photographed several times as picture elements. At this time, generally speaking, typical images one similar to each other. Furthermore, there are other possibilities that since the photographing angle of the camera is varied during the photographing operation and also the subject under photograph is moved, the contents of the pictures are changed in the video cuts. Therefore, it is rather difficult to correctly grasp the contents of the video cuts only from the typical images (characteristic images). Thus, such a content confirming work is required by observing many video cuts which are most likely used in the editing work.

Although the video cut is automatically segmented, the picture elements must be previously segmented into the video cuts in order to form the list. To precisely segment the picture elements in the frame wise with respect to each video cut, the frame images contained in the video image must be compared with each other one by one. As a result, to execute the list forming process by the automatic video segment, the same or more time is required, as compared with the time required to play the overall video image. Thus, the preparation time until the user can commence the editing work would be prolonged. For instance, more than 1 hour is needed when picture elements for 1 hour are segmented into video cuts. This problem is not negligible with respect to such a quick-operable editing work, e.g., editing works of news programs. According to the experience rule available in the actual editing word, it is believed that "picture elements actually used in editing works are less than 10% of entire picture elements". Normally, since the video cuts actually used by the user are small among the photographed picture elements, it is not always preferable to segment all of the picture elements into the video cuts.

The problem of the conventional techniques to be solved are given as follows. That is, to extract a desirable video cut from the picture elements, the operator must find out the first frame (IN frame) and the last frame (OUT frame) of the video cut by utilizing the jog-shuttle dial, the scroll bar of the computer screen, and the like, while confirming the images and the sounds in unit one frame in the manual manner. Also, the list forming process by the automatic video cut segment would require the time longer than, or equal to that required when the overall video image is played, so that the preparation time would be prolonged until the user can commence the editing work. In other words, the automatic video cut extraction from the video image could not be limited to the video cut desired by the user.

SUMMARY OF THE INVENTION

An object of the present invention is to solve these problems of the prior art, and is to provide a change-point-detection control method of a video image, capable of executing an editing work of a video image in a high efficiency, a play-stop control method executed based on this change-point-detection control method, and an editing system of the video image by utilizing these control methods.

To achieve the above-described object, a change point-detection control method of a video image, according to the present invention, is featured by that (1), a judgement is made as to whether or not a frame of a video image is designated by a user; and when the frame is designated by the user, a change point in either a head or a tail of a video cut containing this designated frame, while this frame designation is recognized as a designation of a desirable scene.

(2). The change-point-detection control method of a video image as recited in the above (1) is featured by that:

the video image is played in high speed; and the judgement is made as to whether or not the frame is designated by the user while the video image is played in high speed.

(3). The change-point-detection control method of a video image as recited in the above (1) is featured by that:

the video image is played in high speed; frames are acquired from the video image under playing operation in high speed in a constant time interval; images of the respective acquired frames are displayed in a list as typical images; and the judgement is made as to whether or not the frame is designated by the user based on the selection operation by the user with respect to the respective typical images indicated in the list.

(4). The change-point-detection control method of a video image as recited in the above (3) is featured by that:

a feature amount of a newly acquired frame image is compared with a feature amount of the typical image previously acquired; and when a difference degree between both said frame images, indicated by the comparison result, is larger than, or equal to a predetermined threshold value, the newly acquired frame image is used as the typical image.

(5). The change-point-detection control method of a video image as recited in the above (4) is featured by that:

each of the newly acquired frame images which are not used as the typical images is displayed under the previously compared typical image in such a manner that said each frame image is overlapped at a position where a portion of the each frame image is observed.

(6). The change-point-detection control method of a video image recited in any one of the above (3) to (5) is featured by that:

the frame images and frame positions corresponding to the frame images are displayed in a list.

(7). The change-point-detection control method of a video image recited in any one of the above (1) to (6) is featured by that:

the change point of the video cut containing the designated frame is detected based upon such an operation that the respective frames of the video images under playing operation are converted into digital signals, feature amounts contained in the digital signals of the respective frames are calculated, and the feature amounts of the respective frames are compared with each other.

(8). The change-point-detection control method of a video image as recited in the above (7) is featured by that:

the feature amount of the frame contains a color histogram of the digitalized image signal. (9). The change-point-detection control method of a video image as recited in the above (8) is featured by that:

the feature amount of the frame contains an autocorrelation value of audio data which is read from the video image and is digitalized.

(10). The change-point-detection control method of a video image as recited in the above (9) is featured by that:

information is displayed which indicates that the change point of the video cut containing the designated frame is detected based upon any one of the feature amount of the image signal containing the color histogram and the feature amount of the autocorrelation value of the audio data.

(11). Also, a play-stop control method of a video image according to the present invention is featured by that:

when a change point of a video cut containing a frame designated by a user is detected by the change-point-detection control method of the video image as recited in any one of the above (1) to (10), the playing operation of the video image is stopped at a frame position immediately before this detected change point.

(12). The change-point-detection control method of a video image recited in any one of the above (1) to (10) is featured by that:

based upon the change point detection of the video cut containing the frame designated by the user, both a head frame and a tail frame of a video cut containing the frame designated by the user are obtained;

and the playing operation of the video image is stopped at a position for indicating any one of said obtained head frame and said obtained tail frame.

(13). The play-stop control method of a video image as recited in the above (11) or (12) is featured by that:

when the playing operation of the video image is stopped in connection with said detection of said change point, a frame position of said stop position is read, and the read frame position is displayed in combination with a frame image at said stop position.

(14). Also, in a video image editing system, according to the present invention, comprising at least a video image playing apparatus 110 for playing a video image; a video image input apparatus 103 for time-sequentially inputting the video image played by the video image playing apparatus 110 as a digital signal in a frame wise; and a video image processing apparatus 104 for performing an operation control in response to manual instruction operations of the video image input apparatus 104 and the video image playing apparatus 110, and also for automatically detecting a change point of a video cut based upon a feature amount of the digital signal with respect to each of the frames of the video image, the video image editing system is featured by that the video image processing apparatus 104 is provided with a function for controlling the video image playing apparatus based upon a designation made by a user for an arbitrary frame of the video image under playing operation by the video image playing apparatus 110 and inputted by the video image input apparatus 103 to play the video image in a frame wise; a function for controlling the video image playing apparatus 110 when a change point of a video cut is detected which contains the frame designated by said user with respect to the video image while the video image is played along either a reverse playing direction or a forward playing direction, whereby the playing operation of the video image along either the reverse playing direction or the forward playing direction is stopped; and a function for reading a frame position immediately before the video cut is changed; whereby both the frame position immediately before the video cut is changed, and the frame image are displayed. (15). A computer readable medium, according to the present invention, used in a computer system for playing a video image constructed of a plurality of frames and for detecting either a starting frame or an end frame of a video cut containing an arbitrary frame designated under playing operation, and for saving a computer program comprising the steps of:

inputting the video image into a processing unit of the computer system every 1 frame;

playing the video image to represent the played video image on a display;

accepting an instruction to select an arbitrary frame from the displayed video image;

detecting the starting frame and the end frame of the video cut containing the selected frame; and saving a range of the video image from the starting frame to the end frame in relation to the selected frame.

In accordance with the present invention, the automatic change-point detecting operation for the video cut from the video image under playing operation is controlled based on the instruction issued from the user, so that the automatic video cut segmenting function can be effectively cooperated with the video image editing system. Then, the user can designate a desirable scene by designating the frame while playing the video image. In other words, according to the present invention, the video image is played from the designated from along either the forward playing direction or the reverse playing direction to thereby detect the change point, and the playing operation can be stopped at this change point of the video cut.

For instance, when the user depresses the stop bottom while the video image is played, it is judged that the frame designation is made by the user. The transition (change point) of the video cut of the video image located near this designated frame is detected, and then the playing operation is stopped at this change point. At this time, when the user depressed the stop button during the playing operation along the forward time domain direction, the video image is played up to the tail (OUT) frame within the same video cut and then this playing operation is stopped. When the user depresses the stop button during the playing operation along the reverse time domain direction, the video image is played up to the head (IN) frame within the same video cut and then this playing operation is stopped.

As described above, only the video cut derived by the user can be simply and correctly detected by merely executing a single playing operation of the video image. Since the detecting operation for all of the video cuts is no longer required in advance as in the prior art, the time required for the editing work can be shortened. In particular, when the frame designation by the user is made during the fast forward playing operation, so that a desired scene can be selected at high speed, and thus the desired video cut can be furthermore detected in high speed.

Then, since only the video cut desirably used in the editing work can be extracted to be saved (stored) by utilizing the head position and the tail position of the acquired video cut, the storage apparatus can be utilized in a high efficiency.

Also, since the positional information of the detected video cut and the digital video image of the video cut which is extracted based on this positional information can be immediately utilized in the subsequent editing stages, the video image can be edited in a high efficiency even in the tape editing work and the non-linear (video) editing (digital) editing work.

Also, a plurality of frame images acquired in a predetermined time interval are arrayed as the typical images to be displayed. As a consequence, a list of the typical images can be displayed within a short time, as compared with that for the conventional technique to play the entire picture elements. Then, when the user selects a desirable frame while observing the entire structure of the picture elements, a change point of a video cut containing this frame is detected, and only a desirable video cut is extracted. At this time, in such a case that the typical images are acquired from the video image under playing operation in high speed, and also images having similar pictorial patterns are continued, only one sheet of the continuous resembling typical images is displayed in a list. As a consequence, it is possible to quickly form such a list approximated to the automatic video cut segmenting operation for the overall picture elements.

Furthermore, since the sorts of the feature amounts used to detect the change point are displayed, it is possible to indicate that the playing operation is stopped based upon any one of the change point in the image feature, and the change point in the sound feature. Therefore, the user can detect the video cut further fitted to his will.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein.

DESCRIPTION OF THE PREFERRED EMBODIMENTS

Referring now to drawings, embodiments of the present invention will be described in detail.

Figure 1:
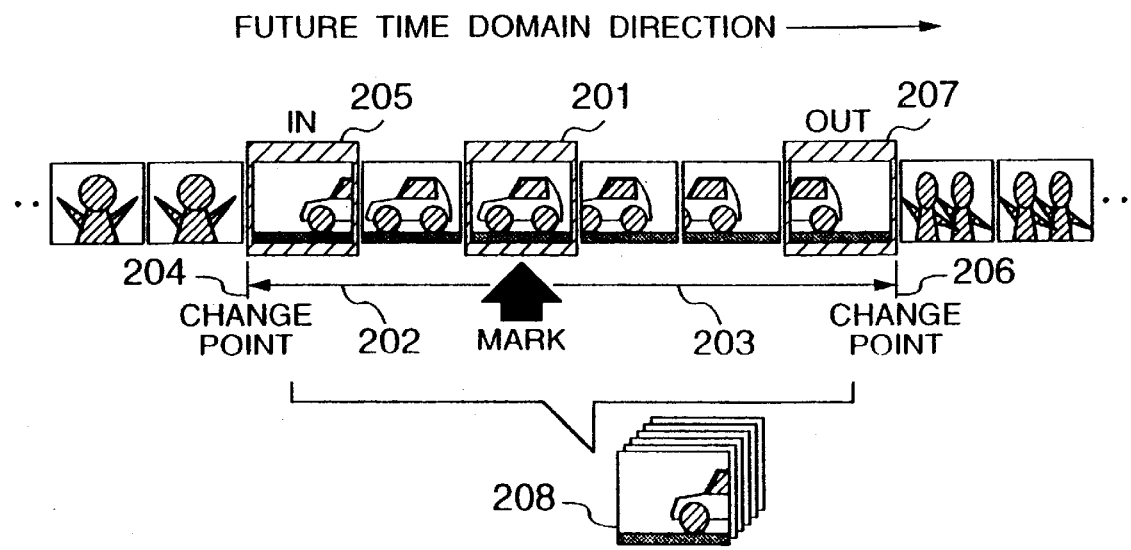
FIG. 1 is an explanatory diagram for explaining operations related to a change-points detecting/controlling method and a play stopping/controlling method of video images according to the present invention.
Figure 2:
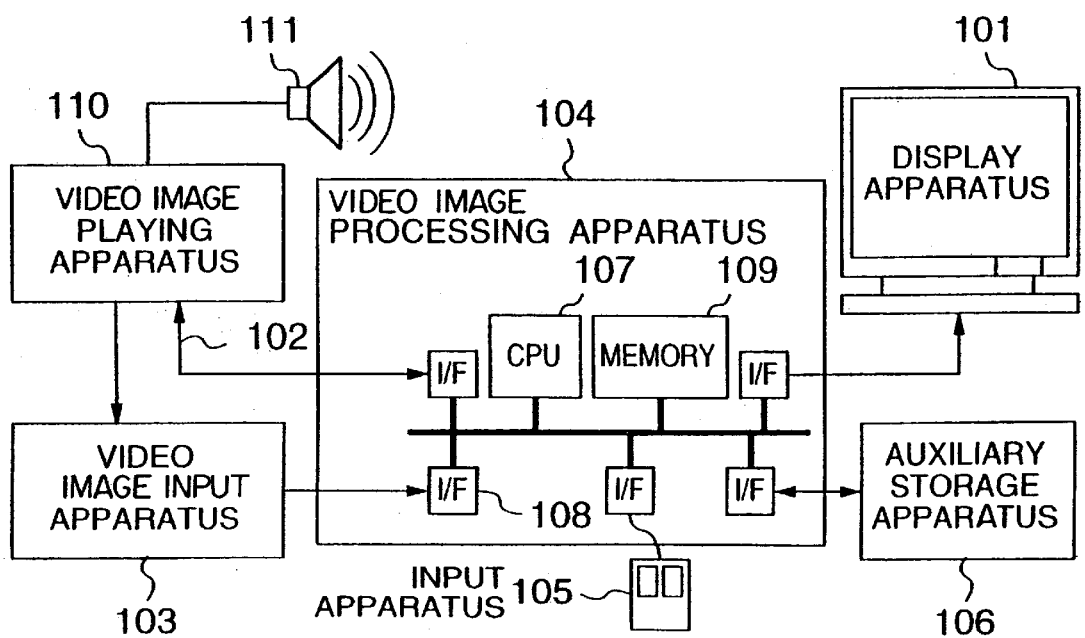
FIG. 2 is a block diagram for representing one structural example of a video images editing system, of the present invention, for executing an editing process of moving picture images by utilizing the change-points detecting/controlling method and the play stopping/controlling method of the video images in FIG. 1.

FIG. 1 is an explanatory diagram for representing operations of an embodiment related to a change-points detecting/controlling method of video images and a play stopping/controlling method of the present invention. FIG. 2 is a block diagram for indicating a structural example of a video image editing system for executing an editing process operation of video images by using these methods.

In FIG. 2, reference numeral 101 is a display apparatus such as a CRT (cathode-ray tube) for displaying an output image of a video image processing apparatus 104. A command to the video image processing apparatus 104 may be issued by using an input apparatus 105 constructed of a pointing device such as a mouse. A video image playing apparatus 110 is an apparatus for playing a video image recorded on a video tape, an optical disk, and the like. As the video image playing apparatus 110, the following apparatuses are utilized, for instance, a video deck equipped with the VISC (video system control architecture) of SONY corporation, and other video decks usually used in professional editing purpose, i.e., apparatuses in which video image playing operations can be controlled by computers. In other words, the playing operation of the frames designated by the user along the past time domain direction (reverse playing direction) and the future time domain direction (formed playing direction) is performed under control of the video image processing apparatus 104.

The image signal and the audio signal played from the video image playing apparatus 110 are sequentially converted into digital signals by a video image input apparatus 103, and the converted digital signals are entered into the video image processing apparatus 104. Voice outputted from the video image playing apparatus 110 can be heard from a speaker 111.

The video image processing apparatus 104 processes the signals with respect to each of the received frames to thereby control the video image playing apparatus 110. Both the video image processing apparatus 104 and the video image playing apparatus 110 transmit and receive a control command and a response via a communication line 102.

In such a case that frame numbers (time codes) are sequentially allocated to the respective frames of the video images handled by the video image playing apparatus 110 from a head image of these video images, this frame number and a retrieve command are transmitted from the video image processing apparatus 104 to the video image playing apparatus 110, so that an image of this relevant frame number can be retrieved. Similarly, the video image processing apparatus 104 requests a frame number to the video image playing apparatus 110, so that the present frame number of the video image can be received.

In the video image processing apparatus 104, the digital image signal and the digital audio signal are inputted via an interface 108 to a memory 109, and are processed by a CPU 107 in accordance with a process program stored in the memory 109. The process program is stored in an auxiliary storage apparatus 106, and is transferred to the memory 109 in response to an instruction of the CPU 107. Also, the digital image signal, the digital audio signal, and various sorts of information such as process results may be stored into the auxiliary storage apparatus 106. Various sorts of data formed by the respective process operations are stored into the memory 109, and may be referred, if required.

The auxiliary storage apparatus 106 may be constructed of an information storage medium such as a magnetic disk and an optical disk, and an apparatus for reading this storage medium. A general-purpose personal computer is employed in the video image processing apparatus 104, and a process operation is executed in accordance with a process program, so that it becomes a video image processing apparatus.

The video image processing apparatus 104 executes the following functions according to the present invention by way of the process operation by the CPU 107 based upon the process program. In other words, the video image processing apparatus 104 executes a function for applying a frame position to a video image so as to display this video image which is inputted by the video image input apparatus 103 and is under play by the video image playing apparatus 110; a function for causing a user to designate a frame position of a video image; and a function to control the video image playing apparatus 110 based upon a user designation for an arbitrary frame of a video image under display, to thereby play the video image in a frame wise along either a reverse playing direction or a forward playing direction. Further, the video image processing apparatus 104 executes a function to detect a change point of a cut containing a frame designated by a user with respect to the video image under play along the reverse playing direction, or the forward playing direction; a function to control the video image playing apparatus 110 when this change point is detected, to thereby stop the playing operation of the video image along the reverse playing direction, or the forward playing direction; and further a function to read out a frame position of a change point of a cut, to thereby obtain a frame position (number) immediately before the cut is changed.

Then, the video image processing apparatus 110 owns a frame number reading function to read frame numbers (time codes) sequentially applied to a corner frame of a video image from a head thereof from the video image playing apparatus; and a frame number recording function for recording the read frame number. The video image playing apparatus 104 records the frame number immediately before the video image is changed, and presents this frame number to the user.

It should be noted that the function to detect the change point of the cut is constituted by a feature amount calculating function for calculating a feature amount of a digital signal with respect to each of the entered frame image; a correlation coefficient calculating function for calculating a correlation coefficient between the feature amount and the feature amounts of more than 1 frame located immediately before one frame; and a change-point detecting function for judging a discontinuity of correlation based upon a combination of the calculated correlation coefficients.

The function for causing the user to designate the frame position of the video image is arranged by a typical image deriving function for acquiring frame images as a typical image in a constant interval; a list displaying function for displaying a plurality of acquired typical images by arranging these images; and a typical image selecting function for causing the user to designate a necessary image from the list of the typical images, in which the user can designate a desired frame in a form to select the typical image. At this time, the typical image deriving function acquires the frame image and, at the same time, the frame number thereof to identify the frame position.

Furthermore, the list display function is arranged by a function to calculate a feature amount of an acquired frame image; a function to calculate a correlation function between this feature amount and another feature amount calculated from a typical image which has immediately before been registered into the list; and a function to add the presently acquired frame image to the list of the typical image when the value of this correlation coefficient is present outside a preselected allowable range, by which the number of the typical images displayed in the list is not vainly increased without continuously displaying the similar typical images.

Also, the image feature amount calculating function owns a function to obtain a histogram of colors with respect to a digitalized frame image. Furthermore, the video image processing apparatus 104 owns such a function to calculate a value of autocorrelation of digital audio data derived from a video image and to calculate a feature amount from the audio data to thereby detect a change point of outs. A feature amount used to detect a change point can be selected by the user, and the video image processing apparatus 104 displays as to whether the feature amount is calculated based on the histogram of colors, or the audio data.

Referring now to FIG. 1, a description will be made of operations by the editing system with such an arrangement, in which only a desirable cut (scene) may be simply played or cut out while confirming a content of a video image by a user.

First, the user plays the video image to confirm the content of this image while the first forward and rewind operations are carried out by using the editing system shown in FIG. 2. The user finds out a scene to be utilized during this work. For instance, when the user finds out such a desirable scene where an automobile is photographed, the user sets a mark to 1 frame 201 contained in the found scene so as to designate the scene. Thereafter, the user requests the system to play the frames from an IN frame (first frame) to an OUT frame (last frame). In response to this request, the system plays the video image from the frame 201 along either the past (reverse playing direction) or future (forward playing direction) time domain direction.

When the video image is stopped at the IN frame position, the system plays the video image along the reverse playing direction 202 to input the video image from the frame 201 in a frame wise. In this case, as to the producing operation along the reverse playing direction, the video image is played under such a condition that the video image is reverse-played at the standard speed, or the change point in the (video) cut such as frame returns can be detected. The feature amounts of the image and the voice are calculated every entered frame, and further the correlation coefficient of the feature amounts between the frames is calculated, and then a change point 204 is detected at which the value of this correlation coefficient exceeds a predetermined allowable range to become discontinuous. It should be noted that when this change point 204 is detected, the video image playing apparatus 110 of FIG. 2 already plays another video cut other than the video cut containing the frame 201. Therefore, the stop position is fine-adjusted to the IN frame (first frame) of the video cut containing the frame 201. A frame 205 located immediately before this change point 204 corresponds to the IN frame of the video cut containing the frame 201.

The playing operation of this IN frame 205 is temporarily stopped by the system, and the frame image and the frame number of the IN frame 205 are displayed on the display apparatus 101 of FIG. 2. During this time, since the system in FIG. 2 causes the display apparatus 101 to display the inputted frame images and the speaker 111 to play the voice, the user can find out the first frame while sequentially confirming the contents of the input frame images.

This playing operation is similarly applied to play the frame images up to the OUT frame (last frame). The system plays the video image along the forward playing direction 203, detects a change point 206, and temporarily stops the playing operation at the OUT frame 207.

As described above, since a mark is attached to the frame 201 and also the IN frame 205 and the OUT frame 207 of the video cut containing this frame 201 are automatically detected to find out the first frame, the user is no longer required to find out a head and a tail of the video cut by using a jog-shuttle dial in a manual manner. In this case, the frame 201 to be marked may be selected from any frame contained in the scene. As a consequence, the user merely marks such a vague designation "a cut is needed around a certain frame", so that a desirable video cut can be detected.

It should be understood that since the images and the voice are played along the reverse direction when the frame images are played toward the IN frame, it is rather difficult that the user can correctly understand the contents thereof. Therefore, for instance, after the IN frame 205 and the OUT frame 207 have been detected, a video cut 208 defined from the IN frame 205 to the OUT frame 207 is played in answer to the user request. Also the video images in this section (video cut) are cut out to be stored into the auxiliary storage apparatus 106.

Thus, the user may play only the video cut 208 where the automobile has been photographed to investigate the content of this video cut 208 in the above-described manner.

Also, since only the video cut 208 is cut out, a capacity of the digital video image to be stored into the auxiliary storage apparatus 106 of FIG. 2 may be reduced. Furthermore, in case of a non-linear editing work, since the digital video image data about the cut-out video cut can be immediately utilized in the subsequent editing steps, the preparation time of the editing work can be reduced. Generally speaking, in the subsequent editing steps, such a special effect is made that the respective video cuts are trimmed to be adjusted, or the respective video cuts are coupled with each other without having a sense of incongruity in order to combine works in good balance. Such a special processing operation can be effectively executed.

Also, in case of the tape editing work, the positional information about the detected IN frame 205 and the detected OUT frame 207 may be used in the editing work. For instance, the detected positional information may be used to form an edit list in a β cam (BETA-CAM) editing apparatus.

Figure 3:
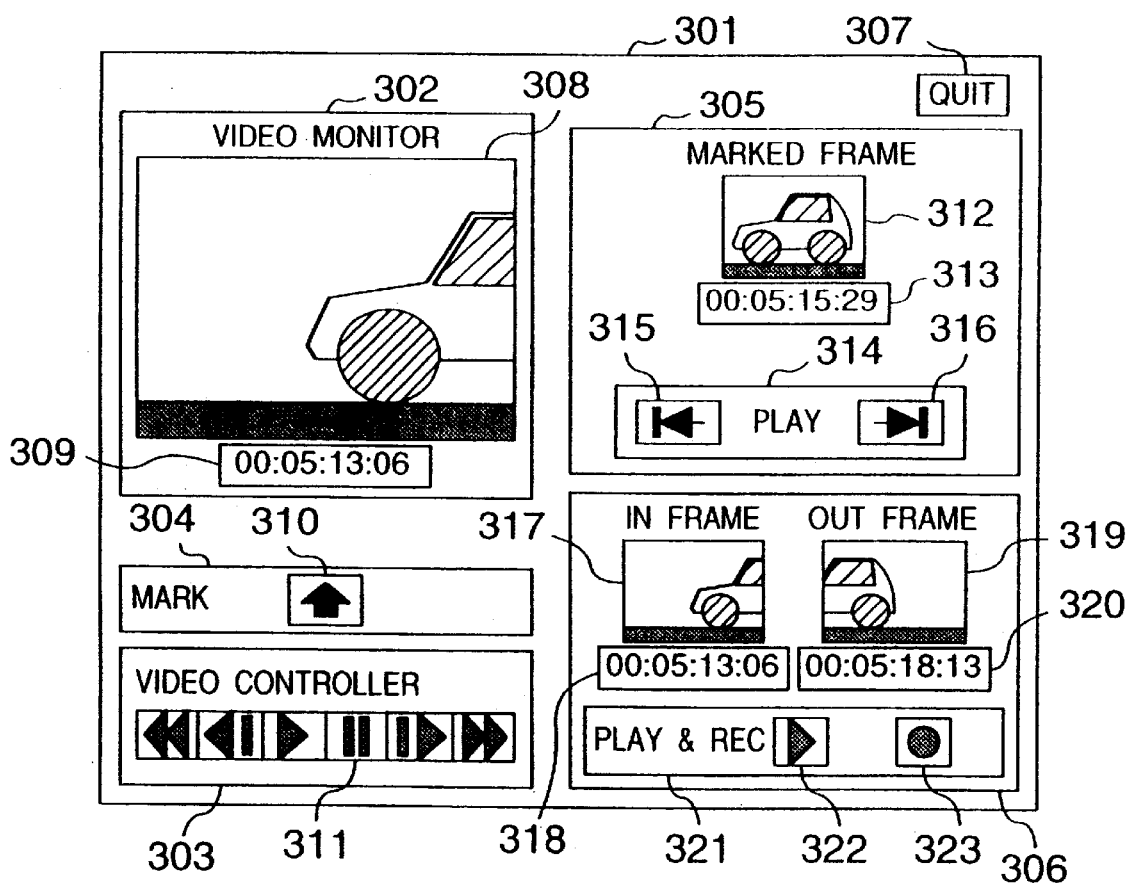
FIG. 3 is an explanatory diagram for showing a first concrete example of a display screen used in a play control operation of video images of the present invention.

FIG. 3 is an explanatory diagram for showing a first concrete example of a display screen used to a play/control operation of a video, according to the present invention.

In this example, an interactive play process window 301 is displayed on the display apparatus 101, which may provide an interactive environment with the system shown in FIG. 2 to the user.

The interactive playing process window 301 is arranged by a monitor 302, a video image playing apparatus operation panel 303, a mark setting panel 304, a mark display panel 305, a (video) cut display panel 306, and an quit button 307. The quit button 307 corresponds to a command button for quitting the interactive process. The user clicks the respective command buttons by using a mouse 105 of FIG. 2 to inform the own instruction to the system so as to proceed with the interactive process. These command buttons are arranged on the interactive playing process window 301.

The monitor 302 is constructed of a video image display region 308 and a frame number display box 309. In the video image display region 308, the frame image entered from the video image input apparatus 103 of FIG. 3 is displayed. In the frame number display box 309, the frame number of the frame displayed in the video image display region 308 is displayed. In this example, since a video image is constituted by 30 pieces of frames per one second, the frame number is converted into the time code which is displayed in such a form "hh:mm:ss:ff (hh=hour, mm-minute, ss=second, ff=frame). Since the frame number is displayed in such a time form rather than the number, as explained above, the position and the length can be intuitively grasped, which is very convenient to the users.

An operation button group 311 is arranged on the video image playing apparatus operation panel 303. This operation button group 311 is command buttons for executing fast forward, rewind, play, frame feed, and pause operations of a video image. The user clicks his necessary command button among the operation button group 311 to instruct the video image playing apparatus 110 of FIG. 2 to execute the relevant operation, so that the user may confirm the image displayed on the monitor 302, and the voice played from the speaker 111 of the video image playing apparatus 110 shown in FIG. 2.

A mark setting button 10 is arranged on the mark setting panel 304. The mark setting button 310 is a command button used to mark a frame. When the user finds out a desirable scene while observing the display of the monitor 302, the user clicks the mark setting button 310 to set the mark. As a result, the user may issue such a rough instruction that "a cut is needed around a certain frame" while confirming the content of the video image.

The mark display panel 305 is arranged by a frame image display region 312, a frame number display box 313, and a play designation panel 314. The frame image display region 312 displays an image of a frame-mark-set by the user. The frame number display box 313 displays the frame number of the frame displayed in the frame image display region 312.

An IN frame (first frame) retrieve button 315 and an OUT frame (last frame) retrieve button 316 are arranged on the play designation panel 314. The IN frame retrieve button 315 is a command button used to play a video image until the IN frame of the video cut containing the frame displayed in the frame image display region 312 is detected. The OUT frame retrieve button 316 is a command button similarly used to play a video image until the OUT frame is detected.

Since the user can find out the head and the tail of the video cut by merely clicking the command buttons such as the IN frame retrieve button 315 and the OUT frame retrieve button 316, the work load can be reduced, as compared with the conventional work such that the playing operation and the pause operation are repeated by the jog-shuttle dial to find out the head and the tail of the video cut.

Also, there is a limitation in detecting the change point of the video image, i.e., each one change point of the frame marked by the user along the forward time domain and the backward time domain. Accordingly, a total number of the change-point detecting process operation can be reduced, and the time required to prepare the editing work by the user can be reduced.

In this case, it is possible to alternatively set the process operation in such a manner that the mark display panel 305 is used as the command button, and when the mark display panel 305 is clicked, the same effect may be achieved by clicking both the IN frame retrieve button 315 and the OUT frame retrieve button 316. As described above, in the case that the mark display panel 305 is used as the command button, the video image is played until the IN frame is detected in a similar manner that the IN frame retrieve button 315 is firstly clicked. Subsequently, the video image is played until the OUT frame is detected in a similar manner that the OUT frame retrieve button 316 is clicked.

At this time, after the user sets the mark by the mark setting button 310, the user merely performs such a single operation that the mark display panel 305 is clicked, so that a desired video cut can be automatically detected.

Similarly, another function is added to the mark setting button 310, and when this mark setting button 310 is clicked, it is possible to alternatively set such a process operation that not only the mark is set to the frame, but the same effect may be achieved by clicking both the IN frame retrieve button 315 and the OUT frame retrieve button 316.

The cut display panel 306 is constructed of a frame image display region 317 for the IN frame; a frame number display box 318; a frame image display region 319 for the OUT frame; a frame number display box 320; and a cut operation panel 321. The image of the IN frame detected by clicking the IN frame retrieve button 315 is displayed in the frame image display region 317 for the IN frame. The frame number of the frame displayed in the frame image display region 317 for the IN frame is displayed in the frame number display box 318. Similarly, the image and the number of the OUT frame detected by clicking the OUT frame retrieve button 316 are displayed in the frame image display region 319 of the OUT frame and in the frame number display box 320.

As described above, since both the IN frame (first frame) and the OUT frame (last frame) are represented on the cut display panel 306, the user can confirm the head and the tail at the same time. As a consequence, the user can easily grasp the content of the video cut such as camera motion (camera works) under photograph operation, and can readily instruct such operations that the video cut is newly played, or extracted.

To execute such operations, a section playing button 322 and a section extracting button 323 are arranged on the cut operation panel 321. The section playing button 322 corresponds to a command button used to play video images in the frame number sections displayed in the frame number display box 318 and the frame number display box 320. Similarly, the section extracting button 323 corresponds to a command button used to store the video images in the section into the auxiliary storage apparatus 106 of FIG. 2 while playing this section.

A video image file name of a video cut stored by the section extracting button 323 may be made of such a numeral series as "hhmmssff" in accordance with the frame number of the marked frame. Alternatively, an input means may be separately provided by which the file name may be set. Since the extracted video cuts can be immediately utilized in the subsequent editing states, the preparation time required for the editing work can be reduced.

Next, an example of the process operations to execute the video image play/control according to the present invention with employment of such display screens shown in FIG. 3 will now be described with reference to FIG. 4 to FIG. 9.

These process operations shown in FIG. 4 to FIG. 9 are executed by the CPU 107 on the video image processing apparatus 104 in FIG. 2.

Figure 4:
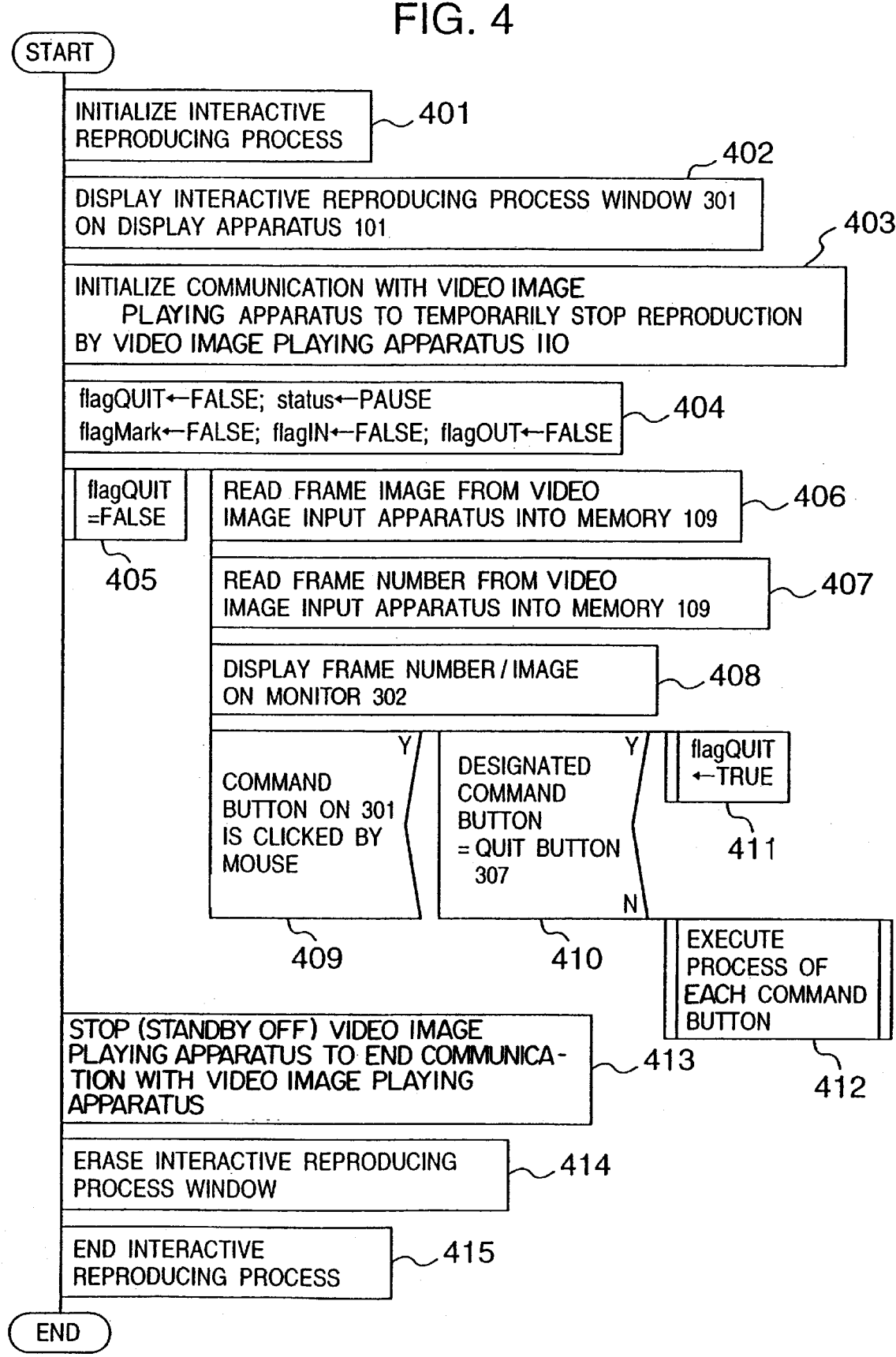
FIG. 4 is a flow chart for representing an overall flow of process operations related to the video image play control according to the present invention.

FIG. 4 is a flow chart for representing an overall flow of process operations related to the video image/control of the present invention.

Upon an issue of initiation of a program from the user, the CPU 107 reads out the program from the auxiliary storage apparatus 106, and stores this program into the memory 109 in FIG. 2.

In FIG. 4, steps 401 to 404 correspond to an initializing process so as to commence the process operation. At the step 401, the CPU 107 of FIG. 7 secures a memory region required to execute the interactive playing process and resets the memory region. Into this memory region, frame image data and a histogram of colors used to detect a change point will be stored later. A structure of data to be stored will be explained later with reference to FIG. 11.

At the step 402, the interactive playing process window 301 shown in FIG. 3 is displayed on the display apparatus 101.

At the step 403, setting of a communication with the video image playing apparatus 110 is initialized, and after a communication port is opened, a control command is transmitted to the video image playing apparatus 110, so that the playing operation by the video image playing apparatus 110 is brought into a pause condition (STANDBY ON). As explained above, the video image playing apparatus 110 is brought not into the step condition, but into the pause condition. Accordingly, when another control command is transmitted, the video image playing apparatus 110 can be immediately operated, so that the frame image and the frame number can be always read out.

At the step 404, a flag group indicative of a process condition is initialized. In this case, "flagQUIT" indicates that an end request is issued from the user "status" shows the operation condition of the video image playing apparatus 101. "flagMARK" indicates that the mark is set by the user "flagIN" denotes that the IN frame of the video cut has already been detected. "flagOUT" shows that the OUT frame of the video cut has already been detected.

It is possible to avoid that either the head or the tail is mistakenly detected while the mark is not set by the flag "flagMark". As to the marked frame, it is possible to avoid such a waste operation that either the head or the tail is detected several times by the flags "flagIN" and "flagOUT".

At a step 405, a judgement is made as to whether or not the end request is issued by the user. The interactive playing process operations defined at the steps 406 to 412 are repeatly performed unless the end request is issued from the user.

At a step 406, a present frame image is inputted. The frame images are sequentially stored from the motion image input apparatus 103 via the interface 108 shown in FIG. 2 into a frame buffer 110 3 secured in the memory 109 on the video image processing apparatus 104 (see FIG. 11).

At this time, the frame images to be inputted may be thinned with having such a dimension that the user can confirm the contents thereof, or such a dimension which can be utilized to detect the change points. For example, the dimensions of the frame images may be made of approximately 160 pixels in width×120 pixels in height, or approximately 80 pixels in width×69 pixels in height. As a result, the data processing amount and the memory amount required in the process operation of the present invention may be reduced, and the load of data transfer operation may be reduced, so that the method according to the present invention can be realized even by employing a low power computer. It should be noted that when the frame images as displayed, the dimensions of the frame images may be enlarged, and thus the enlarged frame images may be displayed.

At a step 407, a frame number read command is transmitted to the video image playing apparatus 110 of FIG. 2, and then the present frame number is received.

At a step 408, the frame image and the frame number, which have been entered at the steps 406 and 407, are displayed on the monitor 302.

The steps 406 to 408 are executed within the loop at the step 405, so that the present video image can be always displayed on the monitor 302 of FIG. 2. Accordingly, the user may directly operate the video image playing apparatus 110 of FIG. 2 to confirm the content of the video image without utilizing the motion-picture-image-playing-apparatus operation button group 311 of FIG. 3.

Next, at a step 409, a request of a user is detected. The request of the user is inputted by clicking the command button by using the mouse of FIG. 2. Accordingly, a judgement is made as to whether or not clicking of the command button is present to thereby detect whether or not a use request, for instance, a frame desired by the user is designated. In other words, when the mouse 105 of FIG. 2 is clicked, the clicked position is compared with the position of each of the command buttons on the interactive playing process window 301 of FIG. 3, in order to discriminate the selected command button from other command buttons. In the case that the command button is clicked, it is judged as to whether or not the designated command button corresponds to an end button 307 (step 410). If the designated button is the end button, then the flag "flagQUIT" is set to "TRUE" (step 411). If the designated button is other button, then a process operation is executed in accordance with the designated command button (step 412).

Steps 413 to 415 correspond to an end process operation so as to accomplish the process operation. At the step 413, a control command is transmitted to the video image playing apparatus 110 of FIG. 2 to thereby bring this video image playing apparatus 110 into a stop condition (STANDBY OFF). Thereafter, the communication port is closed. At the step 414, the interactive playing process window on the display apparatus 101 of FIG. 2 is erased. At the step 45, the secured memory region is released and the process operation is ended.

Figure 5:
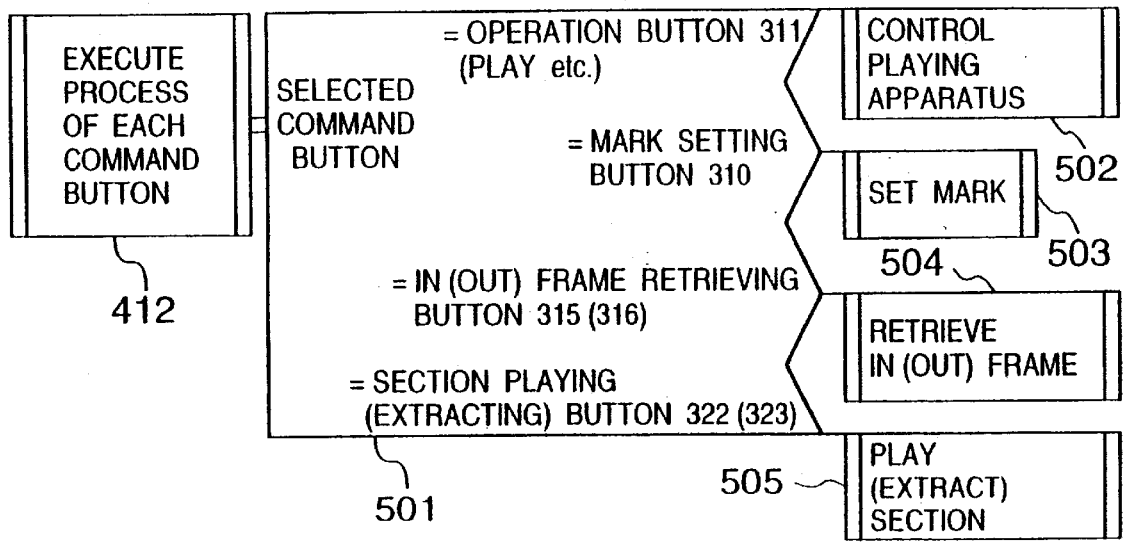
FIG. 5 is a flow chart for showing a process operation defined at a step 412 of FIG. 4.

FIG. 5 is a flow chart for showing a detailed example of the process operation defined at the step 412 of FIG. 4.

This example represents a process flow in response to the designated command button. First, at a step 501, the process operation is branched in response to the designated command button. A total number of branches and a total number of branch judgements may be increased/decreased in accordance with a total number of command buttons and sorts of these command buttons arranged in the interactive playing process window 301 of FIG. 2 in order that the optimum process operation may be continuously selected.

Steps 502 to 505 correspond to process operations in response to the respective command buttons. The step 502 corresponds to a control process operation of the video image playing apparatus, in which a control command is transmitted to the video image playing apparatus 110 of FIG. 2. The step 503 corresponds to a mark setting process operation. The step 504 corresponds to a process operation for retrieving either an IN frame (first frame) of a video cut or an OUT frame (last frame) thereof. At this step 504, the video image is played until the IN frame or OUT frame of the video cut containing the marked frame is detected. In response to the command button 315 or 315 designated by the user, any one of the playing operation up to the head and the playing operation up to the tail is executed. The step 505 corresponds to either a section playing process or a section extracting process. At this step 505, any one of the playing process and the extracting process is carried out with respect to the video cut marked by the user in response to the command buttons 322 and 323 designated by the user.

Figure 6:
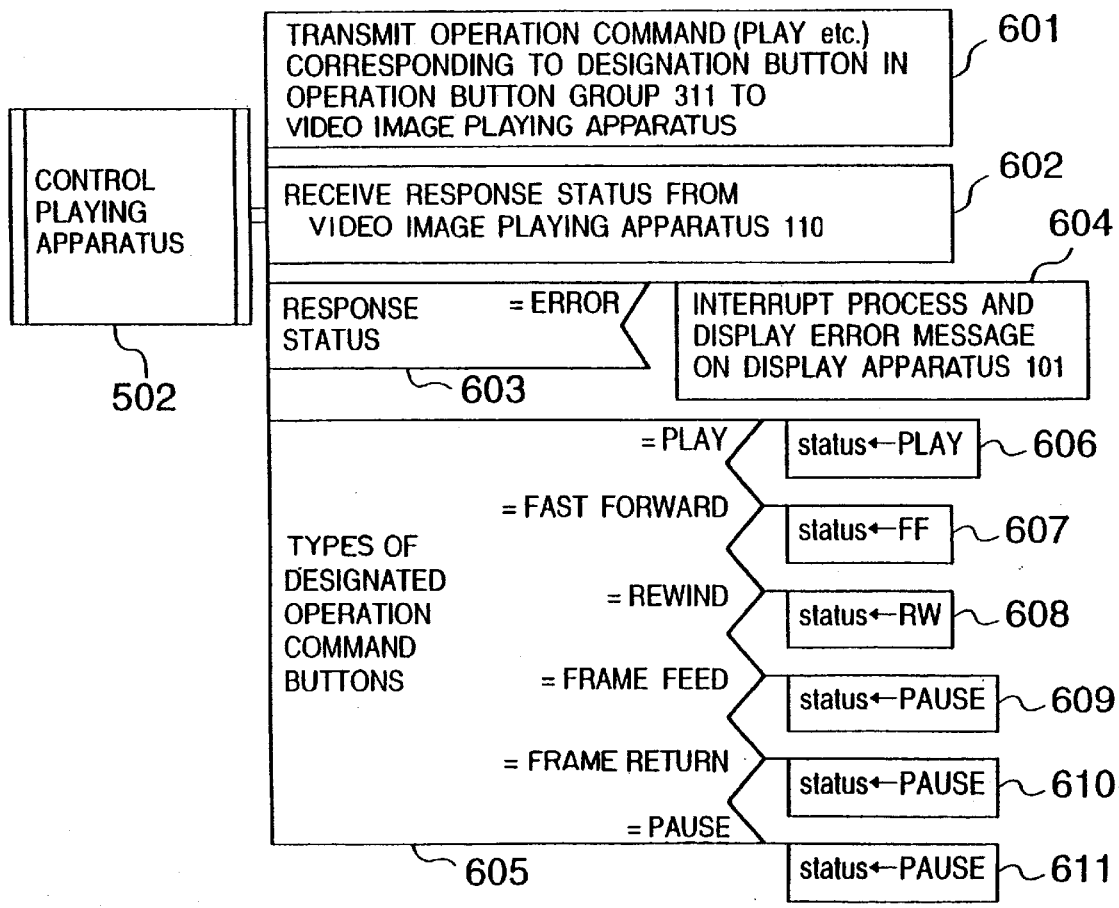
FIG. 6 is a flow chart for indication a process operation defined at a step 502 of FIG. 5.

FIG. 6 is a flow chart for indicating a detailed example of the process operation defined at the step 502.

This example is a flow chart for indicating a control process flow of the video image playing apparatus. It should be understood that the control process as explained below may be widely utilized in various control process operations. That is, not only when the video image playing apparatus operation button group 311 of FIG. 3 is clicked, but also the video image playing apparatus 110 of FIG. 2 is controlled, this control process is utilized over the entire process operation in order to realize the present invention.

At a step 601, a control command is transmitted to the video image playing apparatus 110 of FIG. 2. The control command to be transmitted corresponds to a command corresponding to the command button designated by the user among the video image playing apparatus operation button group 311.

At a step 602, a response status of the video image playing apparatus 110 is received.

At a step 603, the response status is judged. When an error happens to occur, an error message is displayed on the display apparatus 101 and the control process is interrupted at a step 604. When the control process can be done under normal state, "status" indicative of the operation condition of the video image playing apparatus 101 of FIG. 2 is updated in response to the transmitted control command at the next steps 605 to 611. For example, when the control command corresponds to the frame feed and the frame return, since the motion image picture playing apparatus 101 is brought into the pause condition after the execution, "status" is updated to "PAUSE" (steps 609, 610).

In response to the user's request, the video image playing apparatus 110 of FIG. 2 can be controlled in the above-described manner, so that the operation condition of the motion image playing apparatus 110 can be grasped.

Figure 7:
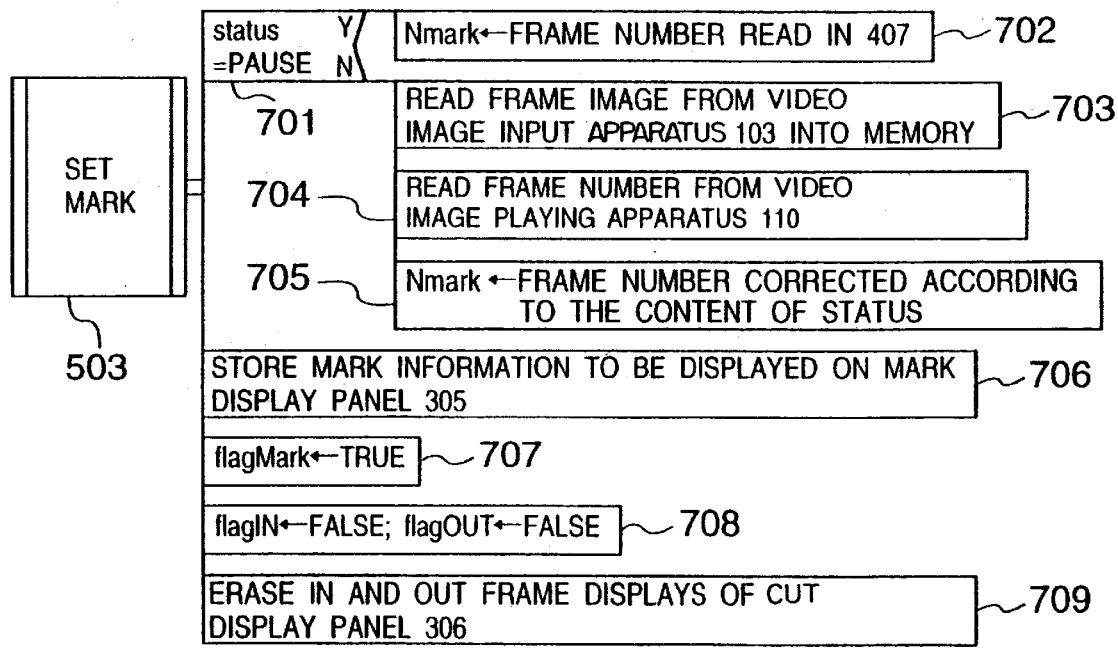
FIG. 7 is a flow chart for showing a process operation defined at a step 503 of FIG. 5.

FIG. 7 is a flow chart for indicating a detailed example of the process operation defined at the step 503 of FIG. 5.

This example shows a flow chart of a process flow in the mark setting operation. When the user sets the mark on the frame of the desired video image, the system reads the marked frame image and the frame number, and then stores then as mark information into the memory 109 of FIG. 2. There are some possibilities that when the video images under play are instantaneously changed while the operation state of the motion image playing apparatus 110 in FIG. 2 is the fast forward or the rewind, the image and the number are different from the actual frames because of a time difference between a time instant when the video image input apparatus of FIG. 2 digitalizes the frame image, and a time instant when the frame number is read by the video image processing apparatus 104 of FIG. 2.

As a result, the frame number is fine-adjusted in accordance with the operation condition "status" of the video image playing apparatus 110 of FIG. 2 as explained at steps 701 to 705.

Since the acquired frame difference owns a constant value every operation state, this frame difference is previously stored as a parameter. This frame difference is subtracted from the read frame number, so that both the frames of the frame image and the frame number can be made coincident with each other. The process operations defined at the steps 701 to 705 may improve reliability of the mark information.

At the step 701, the operation condition "status" is judged. When the "status" is "PAUSE", since the above-described acquired frame difference is not produced, the frame image and the frame number which are inputted at the process operation of the steps 406 and 407 can be directly utilized as the mark information. In other words, the frame number acquired at the step 407 is substituted for the marked number "Nmark" (step 702). When "status" is the status other than "PAUSE", since there is time required to judge the command button at the step 409, a shift is produced between the frames entered at the steps 406 and 407, and the frame under play.

Therefore, the frame image and the frame number are again entered. In other words, at the step 703, the frame image is again inputted in a similar manner to the step 406, and at the step 704, the frame number is again inputted in a similar manner to the step 407. Furthermore, considering the above-described difference, the frame difference caused by "status" is subtracted from the frame number inputted at the step 704, and the subtraction result is fine-adjusted, and then the fine-adjusted subtraction result is substituted for "Nmark".

Figure 11:
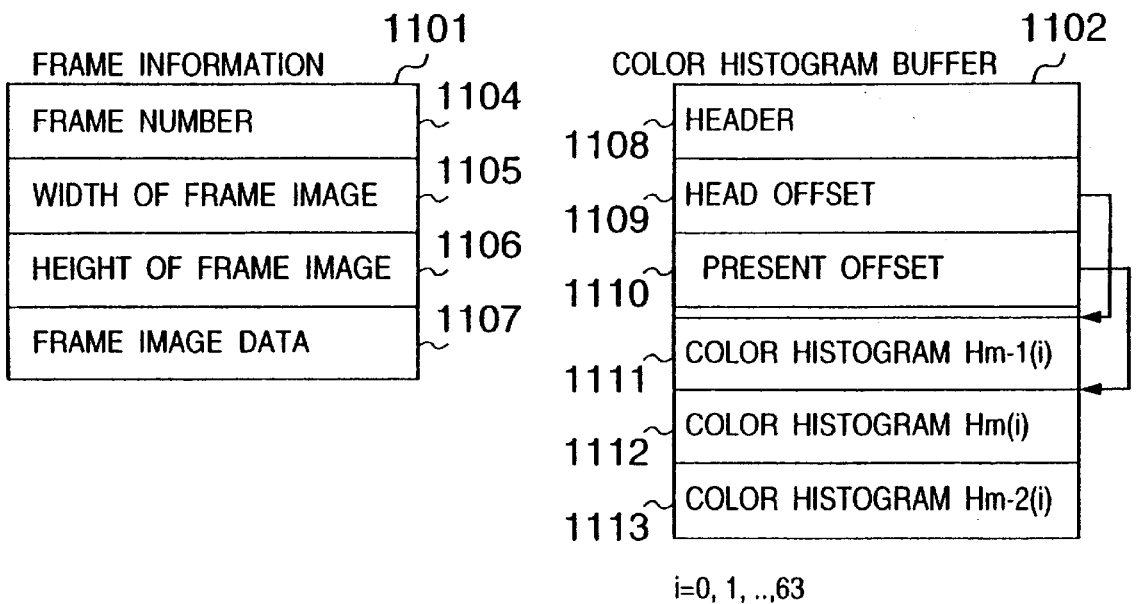
FIG. 11 is an explanatory diagram for showing a structure example of data processed in the system of FIG. 2.
Figure 11:
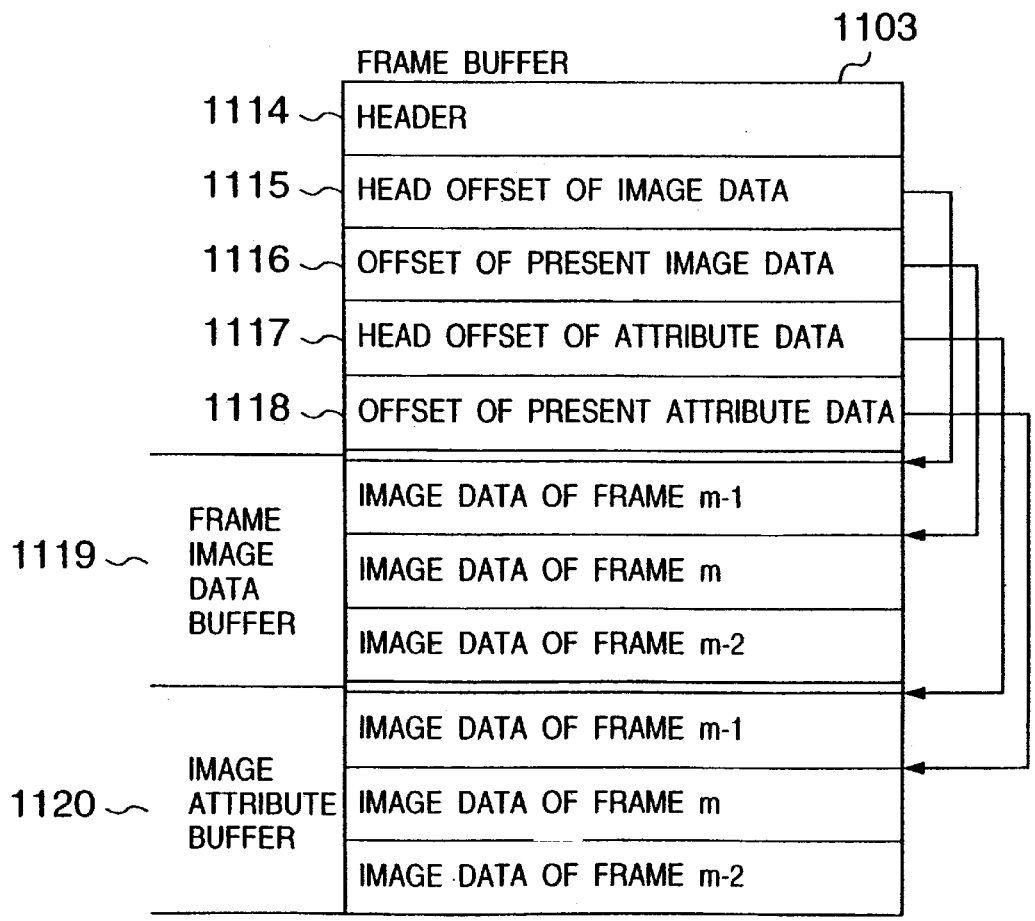

At a step 706, the image and the number "Nmark" of the marked frame are store as the mark information into another region of the memory 109 of FIG. 2. As to the frame image, an image of a frame buffer 103 shown in FIG. 11 is duplicated into a region for the mark information. At this time, the frame images may be thinned to have dimensions required for the representation. Furthermore, the mark information is displayed in the frame image display region 312 and the frame number display box 313 on the mark display panel 305 of FIG. 3.

At a step 707, "TRUE" is substituted for "flagMark", which registers that the mark is set by the user.

While the user confirms the content of the video image, the user can make such a rough designation that "a cut is needed around a certain frame" in the above-described manner.

At steps 708 and 709, the information related to the IN frame and the OUT frame of the video cut which has been detected based on the previous mark information is reset. That is, at the step 708, "FALSE" is substituted for "flagIN" and "flagOUT" to be initialized, which represents detection states of the IN frame and the OUT frame. At the step 709, the indications of the images and the numbers for the IN frame and the OUT frame displayed on the cut display panel 306 of FIG. 3 are erased.

Figure 8:
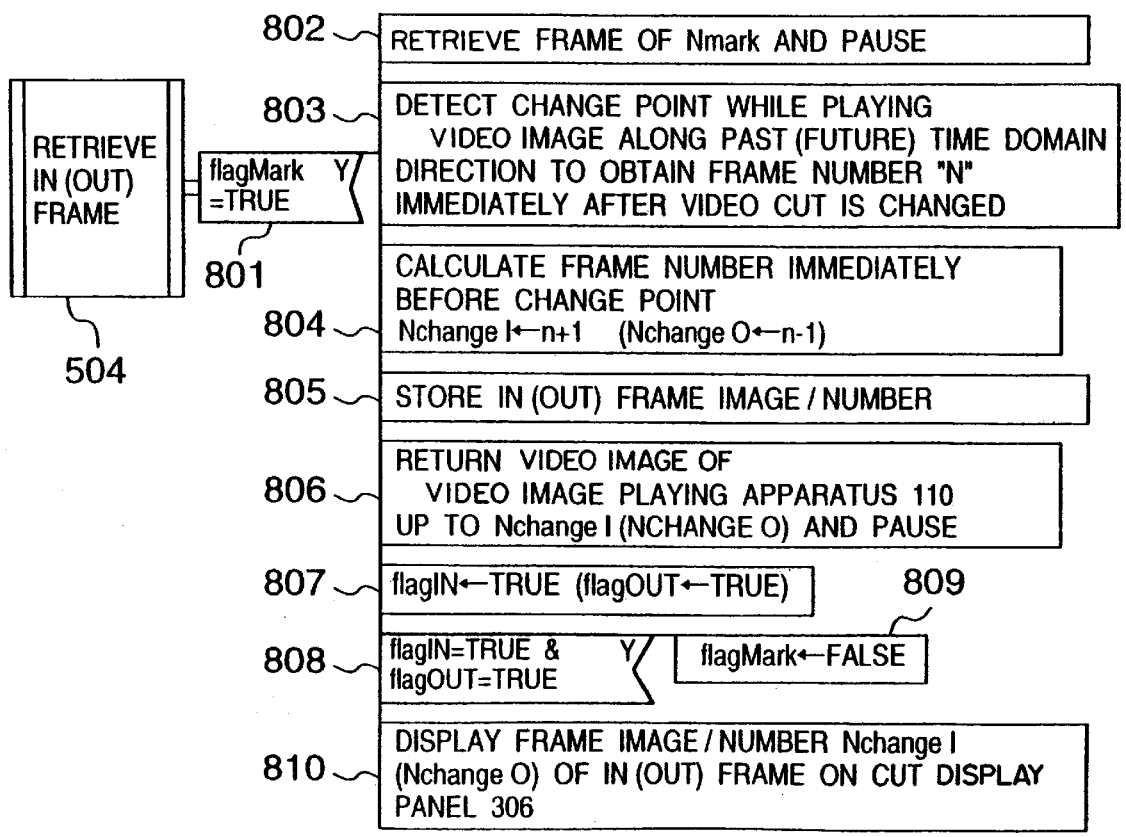
FIG. 8 is a flow chart for indicating a process operation defined at a step 504 of FIG. 5.

FIG. 8 is a flow chart for representing a detailed example of the process operation defined at the step 504 of FIG. 5.

This example shows a flow operation of a process for retrieving an IN(OUT) frame of a video cut containing a frame marked by a user. In such a case that the command button designated by the user corresponds to the IN frame retrieving button 315 of FIG. 3, the frames up to the IN frame are played along the past time domain direction (reverse playing direction). When the command button designated by the user corresponds to the OUT frame retrieving button 316 of FIG. 3, the frames up to the OUT frame are played along the future time domain direction (forward playing direction). As described above, although the playing direction is varied by operating the command buttons, since the process operations to detect the change points are carried out in accordance with the same technique, both the process operations are explained as a combined process operation.

At a step 801, a check is done as to whether or not the mark has already been set by the user. When the mark has been set by the user, process operations defined at steps 802 to 810 are executed. When the mark has not yet been set, no process operation is executed, but the process operation is returned to the process operation within the loop of the step 405.

At a step 802, both the frame number "Nmark" of the marked frame and a retrieve command are transmitted to the video image playing apparatus 110 of FIG. 3, and then the video image playing apparatus 110 is brought into the pause state in the frame of "Nmark".

At step 803, while the video image is played along either the past or future time domain direction in response to the command button designated by the user, the played video images are time-sequentially inputted in a frame wise from the video image apparatus 103 of FIG. 2 is a similar process operation to the step 406. To execute this input process operation by a powerful computer, either the forward playing command or the reverse playing command is transmitted to the video image playing apparatus of FIG. 2 to thereby input the frame images. Also, to execute this input process operation by a low-power computer, either the frame feed command or the frame return command are transmitted to the video image playing apparatus 110 of FIG. 2 to thereby the frame images one by one. In such a case that the video image playing apparatus 110 does not own the reverse playing function at the standard speed, a frame return (feedback) command is sent to the video image playing apparatus 110, so that the frame images may be played in the reverse direction every 1 frame.

Next, a feature amount of an image is calculated in this frame wise, and a correlation coefficient between the successive frames is calculated between this calculated feature amount and another feature amount calculated immediately before this feature amount. A change point such that the value of this correlation coefficient is present outside a preselected allowable range, and thus a frame number "n" immediately after the video cut is changed is calculated. The technique for detecting the change point may be realized by utilizing the previously explained technique as described in JP-A-7-32027 "CHANGE POINT DETECTING METHOD OF MOVING IMAGE". It should be noted that this detection operation will be described later with reference to FIG. 10.

At a step 804, a frame number immediately before the change point is calculated. That is, the frame number immediately before the change point is obtained from the frame number "n" immediately after the change point, and then is substituted for an IN(OUT) frame number NchangeI (NchangeO).

At a step 805, the above-detected frame number and frame image are stored as IN(OUT) frame information in a similar manner to the step 706. Since the change point is detected after the video cut has been changed, when the frame image which is being played when this change point is detected is derived, this derived frame image would become a frame image of another video cut. In this case, such a memory is allocated with having a memory capacity that several sheets of frame images can be stored in the frame buffer 1103 shown in FIG. 3. Then, this memory is used to constitute a ring buffer, so that several sheets of the latest frame images are continuously stored. When the current image is entered into the ring buffer, the last image is overwritten by this latest image. As a consequence, the frame image immediately before the change point may be derived from this ring buffer.

At a step 806, a fine adjustment of the stop position is carried out. In other words, when the change point is detected, the video cut has already been changed. Accordingly, if the playing operation is stopped at the time when the change point is detected, then the playing operation is stopped at another video cut. As a consequence, the frame images are returned by the frame number along a playing direction opposite to the present playing direction, and then the playing operation is temporarily stopped. As a consequence, the playing operation of the video image can be stopped at either the head or the tail of the video cut containing the frame designated by the user. Also, if the playing operation of the frame image is temporarily stopped, then the frame image at the stop position can be continuously displayed on the monitor 302 of FIG. 3, and also either the head or tail of the video cut can be continuously provided to the user.

At a step 807, "TRUE" is substituted for either "flagIN" or "flagOUT" to thereby register that either the IN frame or the OUT frame has been detected.

At a step 808, a judgement is made of the detecting contain for the IN frame or the OUT frame. When both the frames are detected, "FALSE" is substituted for "flagMark". In accordance with the process operation defined at this step 809, it is possible to avoid such a waste detection that the same IN(OUT) frame is detected several times even when the command button 315(316) of FIG. 3 is designated for the same mark.

At a step 810, the frame image and the frame number of the IN(OUT) frame stored at the step 805 are displayed in the frame image display region 31 of the IN frame and the frame number display box 318 thereof (frame image display region 319 and frame number display box 320 of OUT frame) on the cut display panel 306 of FIG. 3. As explained above, both the IN frame and the OUT frame are displayed not only on the monitor 302 of FIG. 3, but also on the cut display panel 306. As a result, even when the user operates the video image playing apparatus of FIG. 2 to change the displays on the monitor 302 of FIG. 3, the head and the tail of the video cut may be provided to the user.

Since the above-described steps are executed, the playing operation can be stopped at the head (tail) of the video cut containing the marked frame by merely clicking the command button 315(316) of FIG. 3 by the user. Thus, the desired frame is no longer required by executing the manual finding operation. Also, since the detection of the change point in the video image may be limited to each one point of either the IN frame or the OUT frame of the video cut, the preparation time required for the editing operation may be reduced.

In this case when the mark display panel 305 of FIG. 3 is made of a command button, if this mark display panel 305 is clicked, then the process operation defined at the above step 801 is executed. Subsequently, as to each of the IN frame retrieving/playing operation and the OUT frame retrieving/playing operation, the process operations defined at the steps 802 to 810 are executed by one time. At this time, such a single operation that after the user has set the mark by using the mark setting button 310 of FIG. 3, the user clicks the mark display panel 305 of FIG. 3 is carried out, so that a desirable video cut can be automatically detected. In this case, if the IN frame retrieving/playing operation and the OUT frame retrieving/playing operation are executed in this order, then the playing operation of the video image may be stopped at the tail of the video cut.

Similarly, in such a case that a function is added to the mark setting button 310 of FIG. 3, when this mark setting button 310 is clicked, after the mark setting process shown in FIG. 7 is executed, the IN frame retrieving/playing operation and the OUT frame retrieving/playing operation are executed. At this time, such a single operation that the user clicks the mark setting button 310 of FIG. 3 is carried out, so that a desirable video cut can be automatically detected.

Figure 9:
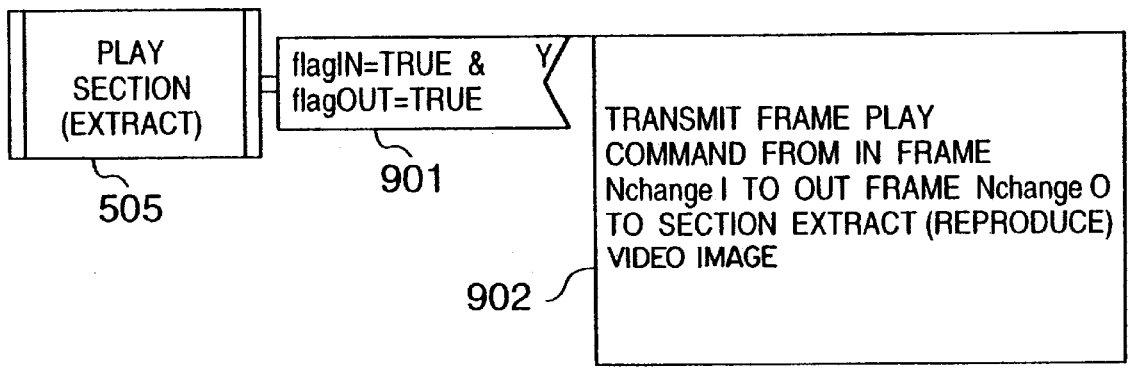
FIG. 9 is a flow chart for showing a process operation defined at a step 504 of FIG. 5.

FIG. 9 is a flow chart for representing a detailed example of the process operation defined at the step 505 of FIG. 5.

This example shows a flow operation of either the section playing process or the section extracting process. When the user designates either the section playing button 322 or the section extracting button 323 provided on the cut operation panel 321, in the case that the video cut containing the frame designated by the user at the previous steps 503 and 504, the detected cut is again played and digitalized to be stored into the auxiliary storage apparatus 106 of FIG. 2.

At a step 901, it is judged as to whether or not the video cut has already been detected. If both the value of "flagIN" and "flagOUT" indicative of the detection states are equal to "TRUE", a process operation defined at a step 902 is executed. If either one of the detecting states is equal to "FALSE", then no process operation is executed, but the process operation is returned to the process operation within the loop of the step 405 shown in FIG. 4.

Next, at the step 902, either the section playing operation or the section extracting operation is carried out in response to the designated command button.

In the case of the section playing operation, the frame numbers "NchangeI" and "NchangeO" of the IN frame and the OUT frame are read out which have been stored in the memory 109 of FIG. 2 at the step 805 of FIG. 8, the section playing commands from the frame numbers "NchangeI" to "NchangeO" are transmitted to the video image playing apparatus 110 of FIG. 2, and then the played frames are read to be displayed on the monitor 302. In the case of the section extracting operation, the read frame is stored in the auxiliary storage apparatus 106 of FIG. 2. Alternatively, the frame image to be stored may be directly stored from the video image input apparatus 103 of FIG. 2 into the auxiliary storage apparatus 106, and this frame image owns the image quality and the size sufficiently utilized in the editing operation. For example, a file name to be stored is set by converting the value of "NchangeI" into a character series. In this case, since the extracted video cut can be immediately used in the subsequent editing operation, the preparation time required for the editing operation can be reduced, and the video cut segmenting function may be effectively cooperated with the conventional video image editing apparatus.

Figure 10:
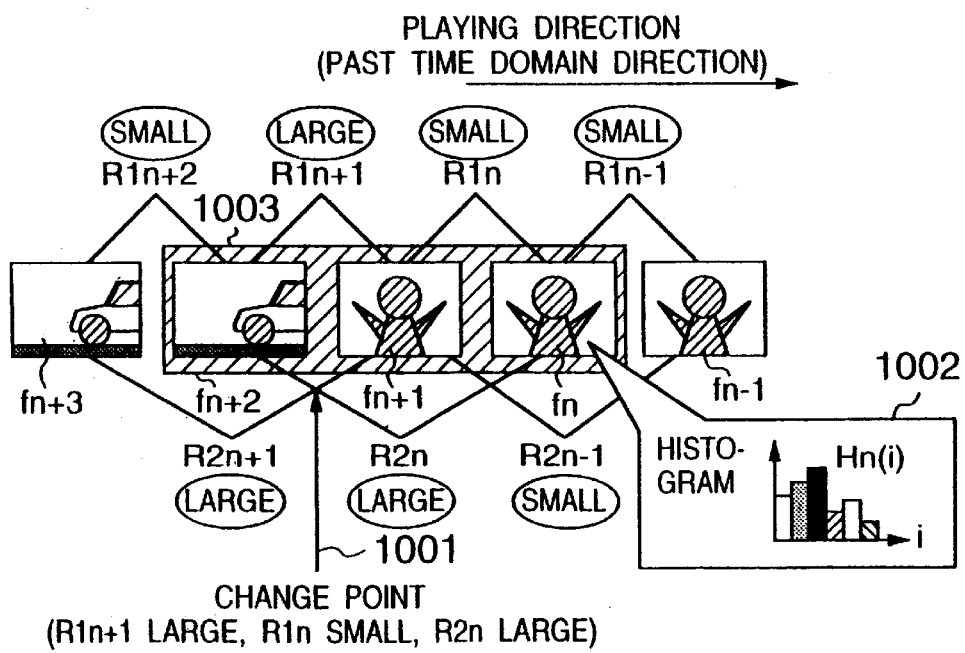
FIG. 10 is an explanatory diagram for indicating an example of the change-points detecting operation for cutting of video images, according to the present invention.

FIG. 10 is an explanatory diagram for indicating an example of a change point detecting operation for a video cut of a video image, according to the present invention.

As previously explained, to detect a video cut change point in a video image, the detection technique described in JP-A-7-32027 "METHOD FOR DETECTING CHANGE POINT OF MOTION IMAGE PICTURE" may be utilized.

This change point detecting technique will now be simply explained. It should be noted that this example represents such a case that the video image is played in the past time domain direction (reverse playing direction), and then the frame numbers are decremented in this manner "n+1, n, n−1" while the frame images are played.

In this change point detecting technique, a histogram of colors "Hn" is formed as a feature amount of a frame image "fn" every frame. A histogram of colors corresponds to a frequency at which the same colored pixels appear in the entire frame image. For instance, in such a case that a histogram of colors "64 colors, each of 2-bit R, G, B colors" is formed, upper 2 bits of the respective RGB pixels of the frame image "fn" are derived to reduce the entire colors into 64 colors. The pixel numbers of the respective colors are counted to form a histogram of colors 1002. The color histogram is represented by an arrangement "Hn(i) (i=0,1, . . . ,63)". Next, a correlation coefficient "R1n" of the color histograms "Hn+1" and "Hn" is calculated between the frame image "fn+1" and the frame image "fn" adjacent to the first-mentioned frame image "fn+1".

Furthermore, another correlation coefficient "R2n" of the color histograms "Hn+2" and "Hn" is calculated between the frame image "fn+2" and the frame image "fn". These correlation coefficients "R1n", "R2n" may be calculated by employing the $\chi^2$ test chi-square test calculation formula widely used in the statistical process, and the calculation formula as described in Japanese Laid-open Patent Application No. 4-11181 (japanese Patent Application No. 2-230930 "METHOD FOR DETECTING CHANGE POINT OF MOVING IMAGE"). The values of the correlation coefficients "R1n", "R2n" become small when the colors and pictorial patterns of the frame images are similar to each other. Conversely, these values of the correlation coefficients become large when the colors and pictorial patterns of the frame images are not similar to each other. Therefore, the correlation coefficients "R1n", "R2n" are compared with a predetermined threshold value to judge whether or not one correlation coefficient is larger than the other correlation coefficient. If "R1n+1" becomes large, "R1" becomes small, and "R2n" becomes large, then it is judged that a change point is present between the frame image "fn+2" and the frame image "fn+1", so that a change point 1001 can be detected. At this time, in this detection process, the frame number "n+1" immediate after the frame change is recorded as the change point.

In the above-described change point detection, since the change point can be detected after 2 frames from the change point 1001, the stop position is fine-adjusted in the steps 804 and 806 in FIG. 8 in order to stop the playing operation at the head and the tail of the video cut.

Reference numeral 1003 shown in FIG. 10 indicates a frame stored in the frame buffer 1103 of FIG. 11. As described above, the change point 1001 is detected at a time instant when the frame image "fn" is acquired to be evaluated. As a result, if at least three frame images are stored into the buffer as in the frame 1003, the frame image "fn+2" immediately before the change point 1001 may be displayed on the cut display panel 320 of FIG. 3.

FIG. 11 is an explanatory diagram for showing a structural example of process data in the system of FIG. 2.

The respective data are stored in the memory 109, or the auxiliary storage apparatus 106 shown in FIG. 2. It should be understood in this case that the present frame is indicated as "m", the frame immediately before the present frame is denoted as "m−1", and the further frame immediately before the present frame is indicated as "m−2".

The frame information 110 1 is arranged by a frame number 1104, a width 1105 of the frame image, a height 1106 of the frame image, and a frame image data 1107. Three sorts of frame information such as mark information, IN frame information, and OUT frame information are stored.

A color histogram buffer 1102 corresponds to a ring buffer used to detect the change point shown in FIG. 10, which continuously stores the color histograms for the three current frames. The information concerning the overall color histogram buffer 1102 is stored in a header 1108, and this information is a data size of an array element for storing a total number of colors used in the histogram (64 colors in case of FIG. 10), and a frequency value. A head offset 1109 corresponds to a value of a head position for indicating that the color histogram of the respective frames has been stored from which position within the color histogram buffer 1102. The present offset 1110 corresponds to a value indicative of a storage starting point of a color histogram array of the present frame "m".

In FIG. 11, reference numerals 1111 to 1113 indicate an array of color histograms with respect to each of frames. Since a data size of this array may be obtained by multiplying a total number of colors of the header 1108 by the data size of the array element, the offset of the each color histograms 1111 to 1113 may be readily calculated from a head offset 1109 and the data size of the array. When a color histogram of the next frame is obtained, the histogram of the latemost frame "m−2" is overwritten by this histogram. In this case, the color histogram 1113 is overwritten by this histogram. At this time, the present offset is rewritten from the offset of the color histogram 1112 to the offset of the color histogram 1113.

The frame buffer 1103 is a ring buffer for storing the information related to 3 sets of the current frames. The frame image and the frame number read in the steps 406 and 407 and the like in FIG. 4 are stored in the frame buffer 1103. The information concerning the overall frame buffer 1103 is stored into a header 1114, and this information includes the width/height of the frame image, the data size per 1 pixel, the data size of the attribute data per 1 frame, and so on.

The head offset 1115 indicates that the frame image data buffer 1119 is stored from which position within the frame buffer 1103 (namely, value of head position).

The present offset 1116 is such a value for indicating a storage starting position of frame image data of the present frame "m".

Similarly, a head offset 1117 of the attribute data indicates a value of a storage head position in the frame buffer 1103 of an image attribute buffer 1120, whereas an offset 1118 of the present attribute data is a value indicative of a storage start position of the attribute data of the present frame "m".

The frame image data of the respective frames are stored in the frame image data buffer 1119, and the image attribute data of the respective frames are stored in the respective frames. In this case, an "image attribute" implies information related to the respective frame images such as a frame number. Similar to the above-described color histogram buffer 1102, the offsets of the respective frame image data and the attribute data may be easily calculated by using the information about the header 1114. Also, the data are rewrite in a similar manner to the color histogram buffer 1102. The information stored in the frame image data buffer 1119 and the image attribute buffer 1120 with respect to each of the frames is stored in the same sequence, and therefore, the information about the same frame can be stored in one-to-one correspondence.

It should be understood as to the data sizes of the above-described data that when the width is selected to be 160 pixels, the height is selected to be 120 pixels, and R, G, B colors are made of 1 bit each, the data size of the frame image data is selected to be 57.6 KB per 1 frame.

Even when a total frame is selected to be 6 frames by 3 frames stored into the frame buffer and 3 frames of the mark information, and the head (tail) frame information, the data size of the frame image data is less than 350 KB. If the color histogram array is 4 bytes per 1 color, then the frequency values can be sufficiently stored. Even if the storage capacity is for 3 frames, the data size of the frame image data is less than 1 KB. Accordingly, the system according to the present invention can be sufficiently installed even in a small power computer having a relatively small memory capacity.

With employment of the above-described system, the user can select a desirable frame while confirming the video image, and can detect the video cut containing this frame, so that the video cut segmenting process can be accomplished within a short time period, as compared with such a case that the overall picture elements are played.

Next, a description will now be made of such an embodiment that an overall structure of a picture element is represented to the user as a list of typical images (characteristic images), and when a desirable typical image is selected from the list by the user, a video cut containing this typical image can be automatically detected.

Figure 12:
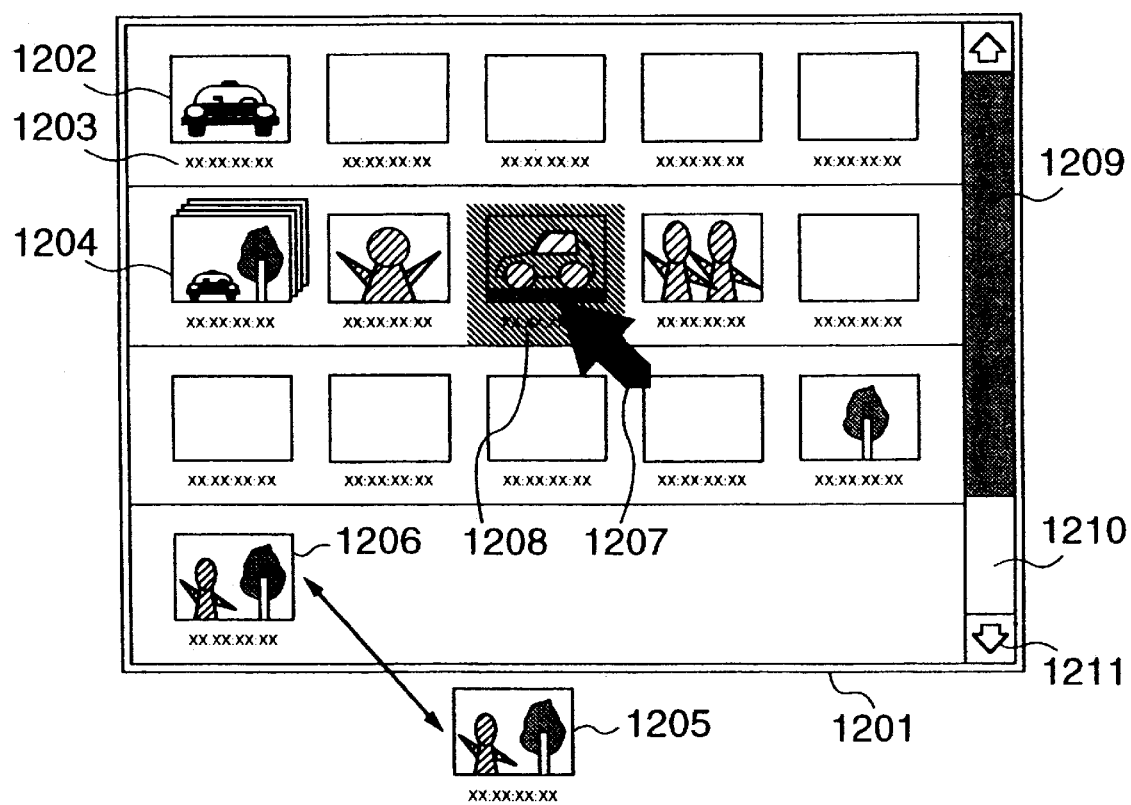
FIG. 12 is an explanatory diagram for representing a structural example of a list display screen about a typical image, according to the present invention.

FIG. 12 is an explanatory diagram for showing an arrangement example of a list display screen for a typical (characteristic) image, according to the present invention.

In this example, frame images which have been acquired in a predetermined time interval are displayed as a typical images 1202 in a list display window 1201. At this time, a frame number 1203 of each of the typical images is displayed in combination with the typical image 1202. Reference numeral 1209 indicates a scroll bar. A scroll arrow 1211 or a drag of a scroll box 1210 of the scroll bar is clicked to scroll the display content on the list display window 1201. With using these elements, it is possible for the user to glance over which images are photographed in which orders and in which positions within the picture, so that the user can easily grasp the overall structure of the picture elements.

To form a list of such typical images, a highspeed playing command is transmitted to the video image playing apparatus 110, and thus the frame images are read in a predetermined time interval under highspeed playing condition.

At the same time, the frame number is read, and the read frame difference is fine-adjusted in a similar manner to the process operation defined at the step 705 of FIG. 7. Then, both the frame images and the frame numbers are displayed on the list display window 1201. The entering process of the frame image and the frame number is carried out in accordance with the process operation, as previously explained at the steps 406 and 407 of FIG. 4.

Since the video image is played at high speed, the list of the typical images can be quickly formed. For instance, it is now assumed that the "ϵ-cam" video deck which is normally, widely used in the professional editing works is employed as the video image playing apparatus 110 of FIG. 2. Since a video image can be played in eight-time high speed by this video deck, it is possible to form a list of typical images from 1-hour picture elements within 8 minutes.

It should be noted that when such a list is simply formed, a plurality of typical images having similar pictorial patterns are continuously displayed with respect to video images produced from either an imaging subject or a camera with less motion. When the time interval for acquiring the typical images is prolonged in order to easily grasp the entire image by reducing a total number of typical images, there is a certain possibility that a video cut having a time period shorter than this acquiring time interval cannot be acquired as the typical image.

To this end, in this case, the typical image is acquired in a sufficiently short time interval (for instance, several seconds), and then the similar typical images are automatically combined with each other to form a single typical image. Reference numeral 1204 indicates a combined typical image.

Now, a description will be made of such a technique that similar typical images are combined with each other so as to reduce a total number of typical images (characteristic images), and therefore an entire image can be easily observed.

When a frame image 1205 is newly acquired as a typical image, a calculation is made of a difference degree between this frame image 1205 and another typical image 1206 which has been displayed in the list display window 1201 immediately before this frame image 1205.

To calculate a difference degree between images, the correlation coefficient for detecting the change point, as described with respect to FIG. 10, is utilized. A correlation efficient "R" between a color histogram of the frame image 1205 and a color histogram of the typical screen 1206 is calculated. This "R" is compared with a predetermined threshold value, and then only when it is judged that the value of "R" is larger than the predetermined threshold value, the frame image 1205 is displayed as the typical image. Conversely, when it is so judged that the value of "R" is smaller than the predetermined threshold value, the thickness of the typical image 1206 is increased as indicated as the typical image 1204, and a plurality of images are combined with each other to form a single image, which can be readily grasped by the user.

In this manner, it is possible to avoid such a condition that the typical images having the similar pictorial patterns are continuously displayed. As to the combined typical images, the user can glance over how many images are combined with each other by checking the thickness thereof, and thus the time difference between the adjacent typical images can be grasped without observing the frame numbers. As a consequence, another list close to automatically cut-segment the overall picture element can be quickly formed. However, according to this technique, when the imaging subject appearing in the picture element is moved roughly, since the value of the correlation coefficient R becomes large, the typical images are continuously displayed. However, in this case, since the movement of the imaging subject can be grasped from the typical images, the user need not newly play the video image so as to confirm the content of this video image. When a video cut is detected, all of the correction coefficients among the three frame images contained in the scene where the motion of the images is rough become large, and no change point can be detected according to the change point detecting technique of FIG. 10. Therefore, there is no problem that the video cut can be detected without any disturbance from the motion.

Next, a description will now be made of such a technique for automatically detecting a video cut when a desirable typical image is selected from a list by the user, this video cut containing this desirable typical image.

Reference numeral 1207 indicates a mouse control. First, when the mouse 105 of FIG. 2 is clicked to select a typical image 1208, this typical image 1208 is reverse-displayed, which may indicate that this typical image is being selected. At this time, the frame number of the typical image 1208 is read, and a retrieve command for retrieving a frame having this frame number is transmitted to the video image playing apparatus 110 of FIG. 2. When the retrieving operation is accomplished, the video image playing apparatus 110 of FIG. 2 is brought into the pause state. Next, while the typical image 1208 is recognized as the marked frame, the IN frame (first frame) and OUT frame. (last frame) of the video cut are detected.

At this time, the mark setting process operation shown in FIG. 7 and the IN(OUT) frame retrieving/playing process operation shown in FIG. 8 may be employed so as to execute the above-described detecting process operation. As a consequence, since the user can select a desirable video frame while glancing over the overall structure of the picture elements, only a desirable video cut can be effectively extracted. In the above case, the video cut is detected immediately after the typical image 1208 is clicked. Alternatively, while the user may select the typical image 1208, the user may click the mark setting button 310 of FIG. 3 to thereby set the mark. Similarly, either the IN frame retrieving button 315 of FIG. 3 or the OUT frame retrieving button 316 may be clicked to retrieve the IN frame or the OUT frame. It should be noted that as to the mouse operations, if another typical image is clicked, then the previous selection may be released, or if the typical image under selection is once more clicked, then the selection may be released.

Figure 13:
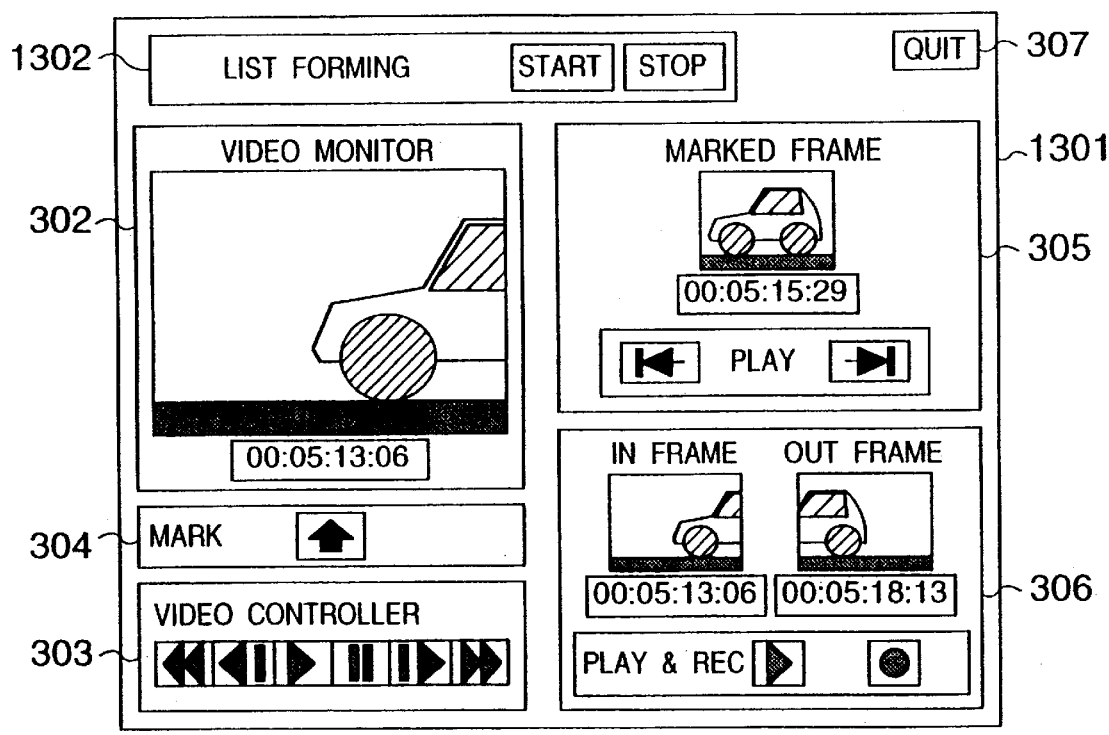
FIG. 13 is an explanatory diagram for indicating a second concrete example of a display screen related to operations of play controls for video images, according to the present invention.

FIG. 13 is an explanatory diagram for indicating a second concrete example of a display screen related to operations of playing control for a video image, according to the present invention.

This example is a operation screen example having a function to form a list of typical images shown in FIG. 12.

An interactive playing process window 1301 provides an interactive environment between the user and the system displayed on the display apparatus 101 of FIG. 2.

The interactive playing process window 1301 owns the monitor 302, the motion-picture-image-playing-apparatus operation panel 303, the mark setting panel 304, the mark display panel 305, the cut display panel 306, the end button 307, as previously explained in FIG. 3, and a list forming panel 1302.

The user manipulates the various operation command buttons on the motion-picture-image-playing-apparatus operation panel 303 to set the head of the video image to such a frame position where the user wishes to start forming of the list.

A starting button for stating the formation of the list, and an end button for ending the formation of the list are arranged on the list forming panel 1302. When the user designates the starting button, the formation of the list is accomplished, so that typical (characteristic) images are represented on the list display window 1201 of FIG. 12.

Figure 14:
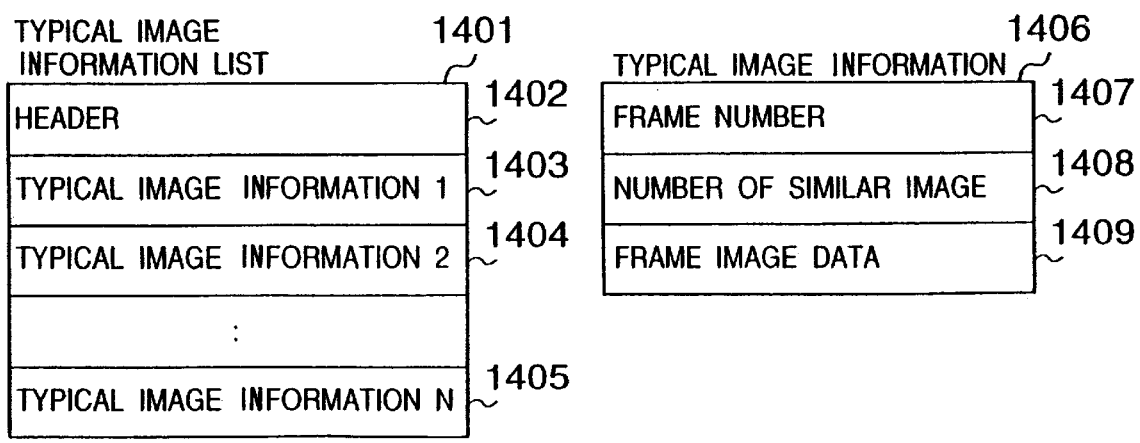
FIG. 14 is a explanatory diagram for showing a data structural example for constituting the list of the typic image in FIG. 12.

FIG. 14 is an explanatory diagram for showing a structural example of data used to constitute the list of the typical images shown in FIG. 12.

In general, since it is predictable that a total number of typical images exceeds several tens of images and thus a data amount is increased, the typical image data are stored into the auxiliary storage apparatus 106 of FIG. 2 and then only necessary sheets of typical images are read out therefrom to be stored in the memory 109 of FIG. 3, only required typical images being represented to the user.

A typical image information list 1401 is to store information related to the list of the typical images. The information related to the overall list of the typical images is stored in a header 1402, and this information includes a total number N of typical images, an acquisition time interval, widths/heights of typical images, and data size per 1 pixel. Reference numerals 1403 to 1405 indicate data regions for storing typical image information 1406 with respect to each of these typical images.

The typical image information 1406 is arranged by a frame number 1407 of a typical image, a total number 1408 of typical images combined with each other, taking account of similarities, and a frame image 1409 of the typical image.

When a typical image is displayed on the list display window 1201 of FIG. 12, both the header 1402 and the typical image information 1406 whose number is equal to the number of the typical image to be displayed are read in the memory 109 of FIG. 2. The typical image information 1406 to be read can be calculated from the position of the scroll box 1210 of FIG. 12, the total number N of the typical screen, and the number of displayed typical images on the list display window 1201.

By doing the above-described operation, the user does not select a desirable frame while confirming the video image, but can select a desirable frame from the list of the typical images, which has been formed at high speed. When the desirable frame is selected, it is possible to automatically detect the video cut containing a desirable frame. As a consequence, the video cut segmenting process can be accomplished within a short time, as compared with such a case that the overall picture element is played.

In accordance with the previously explained playing/controlling technique of the video image, both the user and the system detect the desirable video cuts in the interactive manner one by one. Alternatively, the user previously selects a plurality of desirable frames in an interactive manner with the system, and later detecting operations of video cuts containing the respective frames may be executed.

A description will now be made of another technique for forming a list about a plurality of frames selected by the user, and for detecting a video cut by way of batch processing in accordance with this list.

Figure 15:
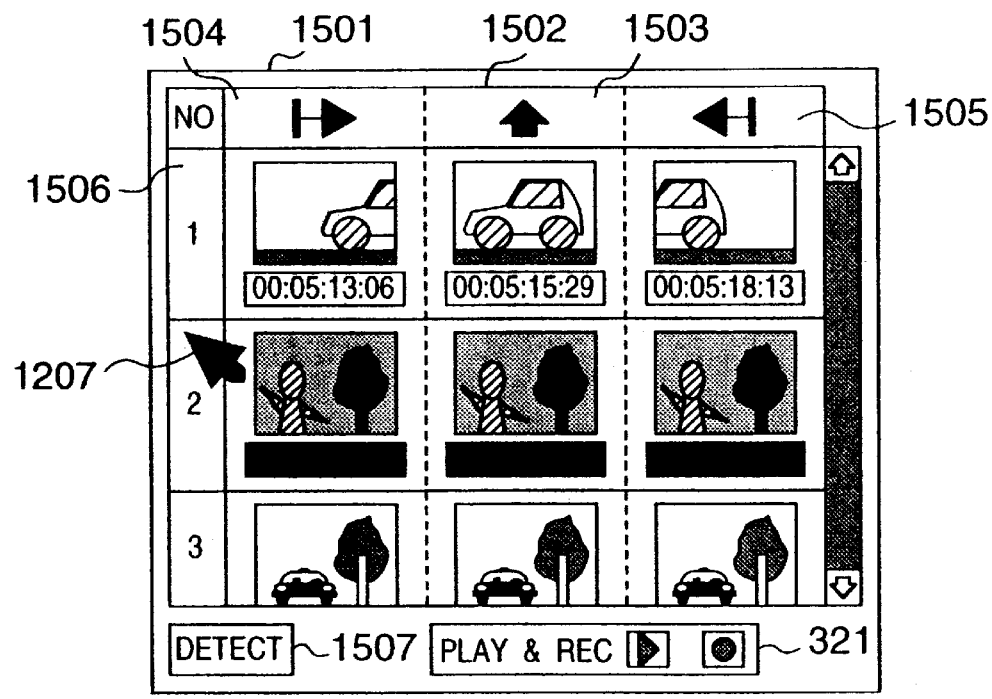
FIG. 15 is an explanatory diagram for indicating a display screen example of a cut information list according to the present invention.

As illustrated in FIG. 15, to detect the video cut by way of the batch processing, a video cut information list for storing an input and an output of a detection process may be prepared. The input of the detection process corresponds to a list of frame information selected by the user, whereas the output of the detection process corresponds to a list of information about an IN frame and an OUT frame.

FIG. 15 is an explanatory diagram for indicating a display screen example of a video cut information list according to the present invention.

A video cut detecting panel 1501 is constructed of a video cut information display panel 1502, a video cut detection button 1507, and a video cut operation panel 321. The video cut information display panel 1502 is constituted by a table from, in which a mark information field 1503, an IN frame information field 1504, and an OUT frame information field 1505 are arrayed along the row direction, whereas video cut information 1506 is arrayed along the column direction.

With respect to the respective video cut information 1506, the frame of the mark information field 1503 becomes an input to the video cut detecting process operation, and the frames of the IN frame information field 1504 and the OUT frame information field 1505 become an output thereof. In this case, the video cut detecting panel 1501 is displayed in the interactive playing process window 301 of FIG. 3 and the list display window 1201 of FIG. 12 instead of two panels of the mark display panel 305 and the video cut display panel 306. Otherwise, the video cut detecting panel 1501 may be displayed on the display apparatus 101 of FIG. 2 as a single window.

A process operation for forming a list of selected frames is carried out in an interactive manner. That is, the user clicks the mark setting button 310 of FIG. 3, or clicks the typical image displayed in the list display window 1201 of FIG. 12, so that the selected frame is stored as the mark information in the list. In connection with the storage, this mark information is displayed in the mark information field 1503 on the video information display panel 1502. As a result, when the list is formed, the batch processing of the cut detection can be executed.

The video cut detecting button 1507 is a command button for executing the batch processing of the cut detection. When the video cut detecting button 1507 is clicked by the user after the list of the selected frames has been formed, the video cut detection is automatically performed as to the respective mark information contained in this mark information. First, an IN frame of a video cut containing the frame of this mark information is detected, and then the detected frame is stored as the IN frame information into the list. Subsequently, the OUT frame is similarly detected, and the detected OUT frame is stored in the list. The frame information is displayed in the IN frame information field 1504, and the OUT frame information field 1505. In this case, the IN and OUT frame detecting process operations may be accomplished by executing the process operation defined from the steps 802 to 810 of FIG. 8 one time, respectively.

As described above, the user can proceed with another work until the automatic video cut detections as to all of the mark information are accomplished.

Also, if the video cut information number on the video cut information display panel 1502 is clicked by using the mouse, this relevant video cut can be selected. At this time, the cut information 1506 is reverse-displayed, which may indicate that this video cut information 1506 has been selected. Reference numeral 1207 is a mouse cursor. In the example of FIG. 15, the video cut information of the number "2" is selected. As a consequence, the video cut which has been detected by the command button on the video cut operation panel 32 may be again played, or may be digitalized to be acquired.

Figure 16:
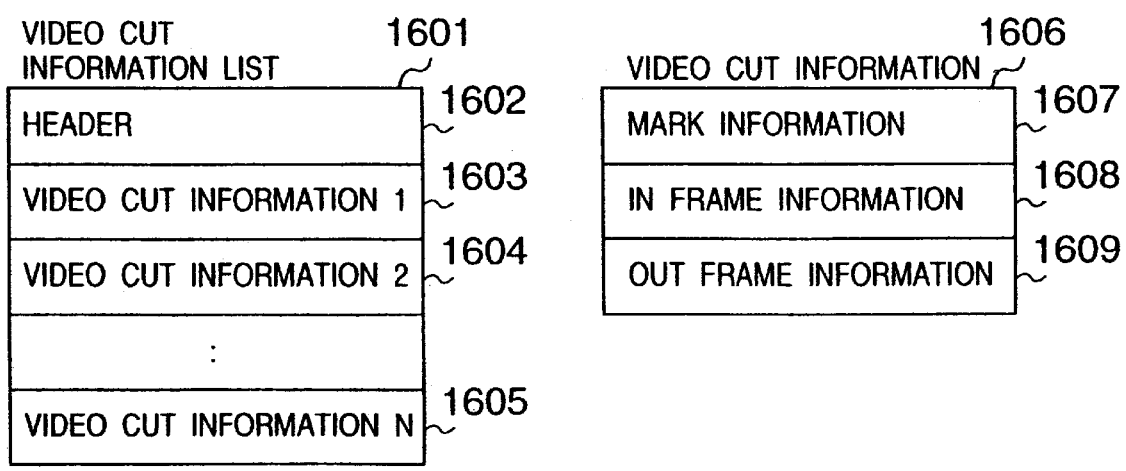
FIG. 16 is an explanatory diagram for representing a data structural example of the cut information list in FIG. 15.

FIG. 16 is an explanatory diagram for showing a data structural example of the video cut information list shown in FIG. 15.

The video cut information list is stored into the auxiliary storage apparatus of FIG. 2 in order that there is no problem even if the data amount becomes large, and only the necessary number of video cut information may be read in the memory 109 of FIG. 2 so as to be represented to the user. Into a header 1602 of the video cut information list 1601, such information about the entire list 1601 is stored which includes a total number N of video cut information, widths/heights of frame images, and a data size per 1 pixel. Reference numerals 1603 to 1605 shown in the video cut information list 1601 denote data regions for storing video cut information 1606 every video cut.

The video cut information 1606 is arranged by mark information 1607, IN frame information 1608, and OUT frame information 1609. The IN frame information 1608 and the OUT frame information 1609 correspond to information about either an IN frame (first frame) or an OUT frame (last frame) of a video cut. Similar to the frame information 110 1 of FIG. 11, a frame number and a frame image are stored in the mark information 1607 to the OUT frame information 1609. Since the frame number is a positive value, negative values are entered into the frame numbers from the mark information 1607 to the OUT frame information 1609 under initial condition. At this time, it is possible to check as to whether or not the mark is not set, and the video cut is not detected, depending on the positive/negative values of the frame number.

In this case, since the cut information list is stored into the auxiliary storage apparatus 106 of FIG. 2, even when the power supply of the video image processing apparatus 104 of FIG. 2 is turned OFF, the video cut information list is not lost. If the user may name a file of the video cut information list stored in the auxiliary storage apparatus 106 of FIG. 2 and then the user may arbitrarily read the named file from this auxiliary storage apparatus 106, then the user may interrupt the work, or restart the work, depending upon his desirable condition.

According to the above-described operations, the video cut containing the frame selected by the user is automatically detected, and then the video cut segmenting process operation can be accomplished within a short time, as compared with such a case that the overall picture element is played. Furthermore, the user can proceed with other works while the video cut is automatically detected.

In the above-described video image playing control, the change point of the video image is detected from the feature of the frame image to detect the video cut. However, when the video cut is detected irrelevant to the sound (audio data), there are some possibilities that the video cuts are segmented during a conversation, and when the segmented video cuts are coupled to each other during the editing operation, the conversation of the cast is interrupted at the coupled boundaries of the video cuts, resulting in a problem. To solve this problem, in the case that the change point of the video image is detected from the image feature, the sound signal at this time is investigated. If the sound is contained, then a point where the sound is subsequently changed (for example, a no sound point where voice disappears, a conversation end point where conversation of a cast is interrupted and then only background sounds (BGM) are produced) may be detected as the change point.

Now, an explanation will be made of a technique for detecting a change point of a video image by using a feature of a sound.

Figure 17:
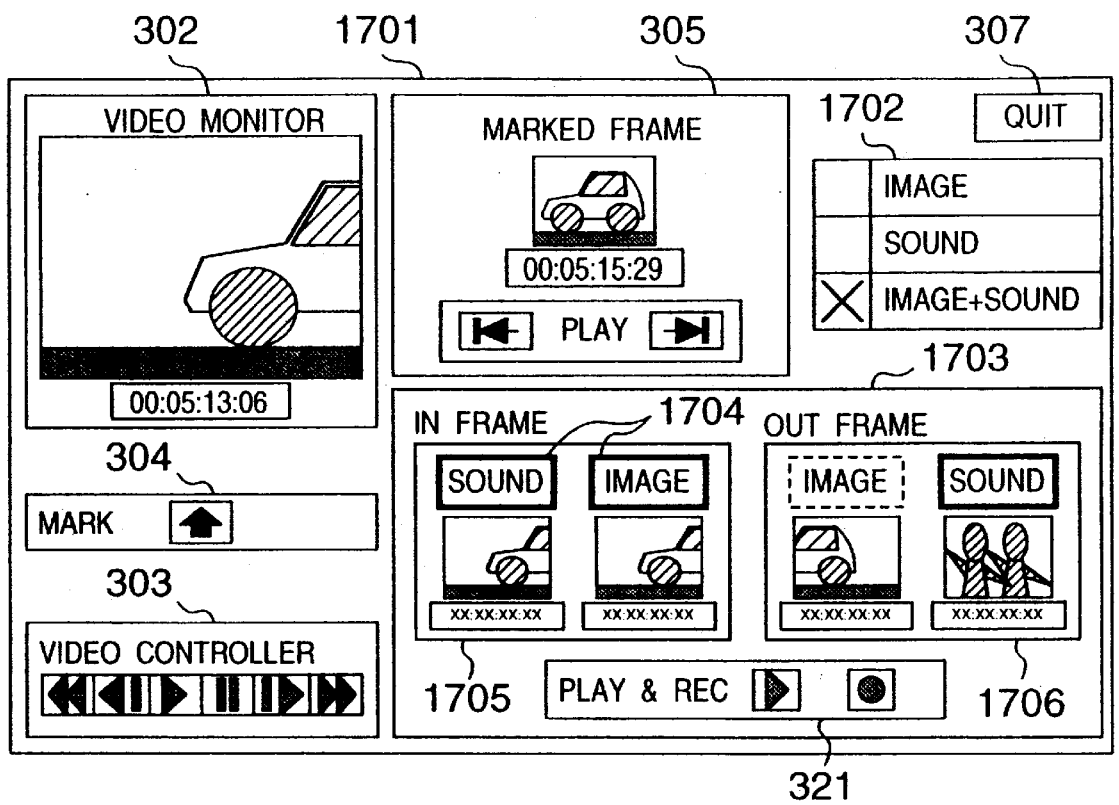
FIG. 17 is an explanatory diagram for showing a third concrete example of a display screen related to the play control operation of the video images according to the present invention.

FIG. 17 is an explanatory diagram for representing a third concrete example of a display screen related to the playing/controlling operation of the video image according to the present invention.

This example indicates an operation screen example in which a stop position is corrected by utilizing a sound feature. An interactive playing process window 1701 is arranged by the monitor 302, the motion-picture-image-playing-apparatus operation panel 303, the mark setting panel 304, the mark display panel 305, the video cut display panel 306, the end button 307, which are explained in FIG. 3, and a feature amount check box 1702 and a video cut display panel 1703. This interactive playing process window 1701 is displayed on the display apparatus 101 of FIG. 2, and may provide an interactive environment between the system and the user.

In the feature amount check box 1702, a list of feature amounts is present which can be used to detect a change point, from which the user can select the feature amount, depending on his desire. In this case, there are represented a feature amount of an image (described as "Image" in the drawing), a feature amount of a sound (described as "Sound" in the drawing), and a combination between then (described as "Image+Sound" in the drawing). In this example, the combination of both the image and sound feature amounts (Image+Sound) is selected. When the user selects "Image", a change point is detected based on a feature amount of an image, as described above.

In such a case that "Image+Sound" is selected as in this example, the change point is first detected based upon the feature amount of the image. At the time when the change point is detected, the process operation is switched to a change point detection of a sound feature amount. In this change point detection of the sound, a sound (audio) signal is checked after a time instant when a change point in an image is detected. Next, a point where the sound is changed is detected, and the change point of the sound is recorded as a change point of a video image.

In the cut display panel 1703, a feature amount display 1704 is added to the video cut display panel 306 of FIG. 3. At this time, both the frame image detected based on the image feature amount, and the frame image detected based on the sound feature amount are displayed in an IN frame display region 1705 are displayed, and the respective frame numbers are displayed. Furthermore, when the IN frame (first frame) is actually detected, the display 1704 of feature amount is displayed in the enhance mode in order to understand as to which feature amount of the image or sound is utilized. A similar enhancement display is applied to an OUT frame (last frame) display region 1706.

In this example, there are represented that as to the IN frame, both the image change point and the sound change point are detected at the same frame, whereas as to the OUT frame, the sound change point is detected.

As described above, since it is possible to display that the frame playing operation is stopped at which change point, i.e., the change point of the image feature, or the change point of the sound feature, the user can detect the video cut furthermore suitable to the user's will. Since the sound change point is detected, it is possible to avoid that the video cuts are segmented during the conversation.

Figure 18:
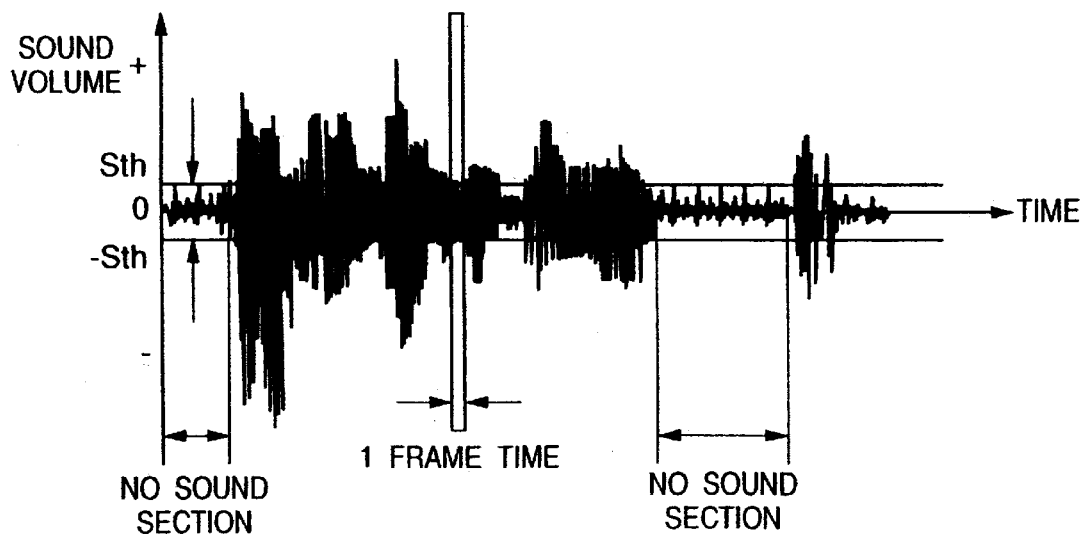
FIG. 18 is an explanatory diagram for showing an audio signal example whose feature changes are to be detected in FIG. 17.

FIG. 18 is an explanatory diagram for representing an example of a sound signal which is used to detect a change in the sound feature of FIG. 17.

In this FIG. 18, an abscissa indicates time, and an ordinate denotes an amplitude of a sound signal. A no sound section is a section where an absolute value of an amplitude is smaller than a predetermined threshold value "Sth". A no sound point may be detected as a starting point of the no sound section. However, there is a certain case that a conversation is instantaneously interrupted among languages during personal conversation, and thus an amplitude is lowered. In order not erroneously detect a no sound point due to an occurrence of such an instantaneous no sound section, a check is done as to whether or not the no sound section is present every sound data for 1 frame. When the amplitudes are low over a preselected frame number, the no sound point is detected. In the case that the conversation end point where the conversation of the cast is interrupted and then only the background sounds such as BGM are present is detected, an autocorrelation coefficient of a audio signal is employed as a feature amount replaceable from a color histogram of an image.

In general, it is known that a human voice owns high autocorrelation. When sample value $\{xn\}$, n=0,1, ... , n−1 of a voice waveform x(t) are given, an autocorrelation coefficient "ri" may be calculated based on the following formula:

$$ri = \frac{1}{N} \sum_{n=0}^{N-1-i} XnXn+i \qquad \text{[Formula 1]}$$

where symbol "ri" is regarded as "Hn(i)", a change point is detected. Since the basic frequencies of human voice are on the order of 50 Hz to 500 Hz, a maximum value of "i" may be obtained by employing data number obtained when the sample values $\{xn\}$ is again sample at a frequency of approximately 1 KHz (=1 msec).

It should be noted that a data structure used to detect the sound change point is similar to that of the frame buffer 1103 in the case of the image in FIG. 11. Instead of the frame image a sound signal for 1 frame is stored. When the sound signal is checked, the sound signal data for a predetermined time period (for instance, 1 second=30 frames) are always stored in the ring buffer on the memory 109 of FIG. 2. When the sound data are acquired at the sampling frequency of 10 KHz, with 16 bits, and in a stereophonic system, since the data amount for 1 second is about 40 KB, no heavy load is given to the memory. When the sound data for 1 frame is read, the sound data of the mostlate frame in the buffer are replaced by the sound data of the latest frame which are then stored. At this time, a judgement is made as to whether or not the no sound section is present from the sound data for 1 frame, and then a condition label for denoting whether or not the no sound section is present is stored into sound attribute data. Also, the autocorrelation coefficient of the sound signal is calculated. The autocorrelation coefficient of sound corresponds to the color histogram in case of the image. Furthermore, the correlation coefficient "R" between the frames is calculated from this autocorrelation coefficient, and then is stored into the sound attribute data.

As previously described with reference to FIG. 1 to FIG. 18, in accordance with the system and the playing/controlling method of the video image of this embodiment, the user can simply extract only a desirable video cut while confirming the content of the video image. As a consequence, it is no longer require such a conventional precise head seeking work of the video cuts by way of the jog-shuttle dial, so that the work efficiency can be greatly increased. Also, since the user selects a desirable frame from the list of the typical images which is formed at high speed, the video cut containing this desirable frame can be automatically detected. Accordingly, it is possible to accomplish the video cut segmenting process within a shorter time then when the entire picture elements are played. This is effective for a high urgent editing usage. Furthermore, since the detected video cut can be immediately utilized in the subsequent editing stages, the video cut segmenting function can be effectively cooperated with the conventional video image editing apparatus.

It should be understood that the present invention is not limited only to the above-described embodiments with reference to FIG. 1 to FIG. 18, but may be modified without departing from the technical spirit and scope of the present invention. For instance, even when all of the picture elements are digitalized and the digitalized picture elements are stored as digital video images into the auxiliary storage apparatus of FIG. 2, the digital video images may be played every video cut by utilizing the video image playing/controlling technique of the present invention, or the digital video images may be stored into another region of the auxiliary storage apparatus 106 of FIG. 6. In other words, when the digital video image is handled, the video image data file within the auxiliary storage apparatus 106 is operated instead of controlling of the motion image playing apparatus 110 shown in FIG. 2, or of entering of the data from the video image input apparatus 103. Then, the previously explained process operation of the present invention such as the process operation for detecting the change point can be similarly executed by reading the image data and the sound data every frame from the video image data file. Therefore, even in case of the digital video image editing system, the video cut containing the frame selected by the user can be automatically detected. The video cut segmenting process operation can be accomplished in a shorter time than when the entire picture elements are played.

In accordance with the present invention, since the video cut automatic extracting operation from the video image is executed only to the video cut desired by the user, the user can directly, automatically, and correctly acquire only a desired video cut (involving a frame) from the video images under play at high speed, so that the video images can be edited in a high efficiency.

We claim:

1. A method for detecting a change point of a video cut of a video image during a playing operation based on a feature amount of frames of the video image, the method comprising the steps of:

judging whether or not a frame of the video image has been designated by a user; and when it is judged in the judging step that the frame has been designated by the user, detecting a change point at either a head or a tail of a video cut of the video image containing the designated frame.

2. A method according to claim 1, further comprising the step of playing the video image at high speed;

wherein the judging step is performed while the video image is being played at high speed.

3. A method according to claim 1, further comprising the steps of:

playing the video image at high speed;

acquiring frames at a constant time interval from the video image while the video image is being played at high speed; and displaying images of the acquired frames in a list as typical images;

wherein the judging step includes the step of selecting an image from the typical images displayed in the list.

4. A method according to claim 3, further comprising the steps of:
 comparing a feature amount of a newly acquired frame image with a feature amount of a previously acquired typical image; and
 when a difference between the feature amount of the newly acquired frame image and the feature amount of the previously acquired typical image, as indicated by a result of the comparing step, is larger than or equal to a predetermined threshold value, using the newly acquired frame image as a typical image.

5. A method according to claim 4, further comprising the step of displaying each of the newly acquired frame images which are not used as the typical images under the previously compared typical image in such a manner that each frame image is overlapped at a position where a portion of each frame image is observed.

6. A method according to claim 3, further comprising the step of displaying the frame images and frame positions corresponding to the frame images in a list.

7. A method according to claim 1, wherein the step of detecting the change point of the video cut containing the designated frame includes the steps of:
 converting frames of the video image under a playing operation into digital signals;
 calculating feature amounts contained in the digital signals of the respective frames; and
 comparing the feature amounts of the respective frames with each other.

8. A method according to claim 7, wherein the feature amount of the frame contains a color histogram of the digital signal.

9. A method according to claim 8, wherein the feature amount of the frame contains an autocorrelation value of audio data which is read from the video image and is digitized.

10. A method according to claim 9, further comprising the step of displaying information which indicates that the change point of the video cut containing the designated frame is detected based on any one of the feature amount of the image signal containing the color histogram and the feature amount of the autocorrelation value of the audio data.

11. A play-stop control method of a video image comprising the steps of:
 designating an arbitrary image within a video image under a playing operation;
 detecting a change point of either a head or a tail of a video cut containing a frame of the designated image based on a feature amount of each frame;
 playing the video image from the designated frame along either a forward time direction or a reverse time direction; and
 stopping the playing operation of the video image at a frame position immediately before the change point of either the tail or the head of the video cut with respect to the playing direction.

12. A method according to claim 1, further comprising the steps of:
 obtaining both a head frame and a tail frame of a video cut containing the frame designated by the user; and
 stopping the playing operation of the video image at a position for indicating any one of the obtained head frame and the obtained tail frame.

13. A play-stop control method of a video image according to claim 11, wherein further comprising the step of, when the playing operation of the video image is stopped in connection with the detection of the change point, displaying a frame position of the stop position in combination with a frame image at the stop position.

14. A video image editing system comprising:
 a video image playing apparatus for playing a video image;
 a video image input apparatus for time-sequentially inputting the video image played by the video image playing apparatus as a digital signal frame by frame; and
 a video image processing apparatus for performing an operation control in response to manual instruction operations of the video image input apparatus and the video image playing apparatus, and also for automatically detecting a change point of a video cut of the video image based on a feature amount of the digital signal with respect to each of the frames of the video image;
 wherein the video image processing apparatus includes
 means for controlling the video image playing apparatus based on a designation made by a user for an arbitrary frame of the video image under a playing operation by the video image playing apparatus and inputted by the video image input apparatus, and for controlling the video image playing apparatus when a change point of a video cut is detected which contains the frame designated by the user with respect to the video image while the video image is played along either a reverse playing direction or a forward playing direction, whereby the playing operation of the video image along either the reverse playing direction or the forward playing direction is stopped; and
 means for reading a frame position immediately before the video cut is changed;
 whereby both the frame position immediately before the video cut is changed, and the frame image are displayed.

15. A computer readable medium used in a computer system for playing a video image constructed of a plurality of frames and for detecting either a starting frame or an end frame of a video cut containing an arbitrary frame designated under a playing operation, and for saving a computer program comprising the steps of:
 inputting the video image into a processing unit of the computer system every 1 frame;
 playing the video image to represent the played video image on a display;
 accepting an instruction to select an arbitrary frame from the displayed video image;
 detecting the starting frame and the end frame of the video cut containing the selected frame; and
 saving a range of the video image from the starting frame to the end frame in relation to the selected frame.

16. A method for detecting a change point of a video cut of a video image, the method comprising the steps of:
 reproducing a video image on a screen, the video image including a plurality of video cuts each including a plurality of frames;
 detecting an input designating one of the frames on the screen;
 detecting a video cut including the designated frame based on a feature amount of frames of the video image; and displaying a head frame or a tail frame of the detected video cut including the designated frame.

17. A method according to claim 16, wherein the reproducing step includes the step of reproducing the video image at a higher speed than a speed during normal reproduction of the video image.

18. A method according to claim 17, wherein the reproducing step includes the steps of:

obtaining frames at a constant time interval; and displaying the frames in a list as typical images;

wherein a frame in the list is indicated as a frame on the screen in the detecting step.

19. A video image editing system comprising:

a video image playing apparatus for playing a video image;

a video image input apparatus for time sequentially inputting the video image played by the video image playing apparatus as a digital signal frame by frame; and a video image processing apparatus for performing an operation control in response to manual instruction operations of the video image input apparatus and the video image playing apparatus, and also for automatically detecting a change point of a video cut of the video image based on a feature amount of the digital signal with respect to the frames of the video image;

wherein the video image processing apparatus includes means for obtaining a plurality of frames from the inputted video image at a constant time interval, and means for detecting, when one of the frames played by the video image playing apparatus has been designated by a user, a change point of a video cut of the video image having the designated frame.

* * * * *